United States Patent
Katayama et al.

(10) Patent No.: US 10,245,889 B2
(45) Date of Patent: Apr. 2, 2019

(54) PNEUMATIC TIRE HAVING LUG GROOVES FORMING A DIRECTION TREAD PATTERN

(71) Applicant: BRIDGESTONE CORPORATION, Tokyo (JP)

(72) Inventors: Shinsaku Katayama, Kodaira (JP); Eisuke Seta, Kodaira (JP); Yoshio Kaji, Kodaira (JP); Masafumi Koide, Kodaira (JP); Takayuki Kurata, Kodaira (JP); Hiroyuki Katsuno, Kodaira (JP); Masakazu Amano, Kodaira (JP); Ataka Takei, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 233 days.

(21) Appl. No.: 14/648,304

(22) PCT Filed: Nov. 28, 2013

(86) PCT No.: PCT/JP2013/082099
§ 371 (c)(1),
(2) Date: May 29, 2015

(87) PCT Pub. No.: WO2014/084325
PCT Pub. Date: Jun. 5, 2014

(65) Prior Publication Data
US 2015/0298506 A1 Oct. 22, 2015

(30) Foreign Application Priority Data
Nov. 30, 2012 (JP) .................................. 2012-263816

(51) Int. Cl.
*B60C 11/03* (2006.01)
*B60C 11/13* (2006.01)
(Continued)

(52) U.S. Cl.
CPC ............ *B60C 11/0311* (2013.01); *B60C 5/00* (2013.01); *B60C 11/0302* (2013.01);
(Continued)

(58) Field of Classification Search
CPC ............... B60C 5/00; B60C 2011/0313; B60C 2011/0341; B60C 2011/0344;
(Continued)

(56) References Cited

U.S. PATENT DOCUMENTS 5,105,864 A * 4/1992 Watanabe ............... B60C 11/00
152/209.18
5,688,342 A * 11/1997 Sugihara ................. B60C 11/00
152/209.15
(Continued)

FOREIGN PATENT DOCUMENTS

DE 102011055915 A1 6/2013
EP 0 782 936 A1 7/1997
(Continued)

OTHER PUBLICATIONS

Kim (KR 10-0902393, Jun. 11, 2009, machine translation).*
(Continued)

*Primary Examiner* — Robert C Dye
*Assistant Examiner* — Sedef E Paquette
(74) *Attorney, Agent, or Firm* — Sughrue Mion, PLLC

(57) ABSTRACT

A pneumatic tire (10), which has, in the surface of the tread (11), lug grooves (15) on one side extending from one axial edge towards the axial center of the tire in such a manner as to intersect with the circumferential direction of the tire and lug grooves (15) on the other side extending in a symmetrically opposite direction from the axial center towards the other axial edge of the tire, has at least one circumferential groove (12) extending circumferentially around the tire. Also, circumferential grooves (12, 13a, 13b) are so formed
(Continued)

as to satisfy a relationship of "1≤(S/L)≤3" where L is the axial length of the central region, which is the region enclosed by two straight parallel lines each passing through the center between the contact width center (CL) and the contact edge with the shoulder regions being the regions axially outside of the parallel lines, and S is the total of the groove areas of the circumferential grooves (12, 13a, 13b) disposed in the central region. Therefore, the pneumatic tire (10) not only secures the steering stability performance on wet road surfaces, but also improves the steering stability and wear resistance performance on dry road surfaces.

16 Claims, 16 Drawing Sheets

(51) Int. Cl.
*B60C 11/12* (2006.01)
*B60C 5/00* (2006.01)

(52) U.S. Cl.
CPC ........ *B60C 11/033* (2013.01); *B60C 11/0306* (2013.01); *B60C 11/0332* (2013.01); *B60C 11/1236* (2013.01); *B60C 11/1263* (2013.01); *B60C 11/1369* (2013.01); *B60C 2011/0313* (2013.01); *B60C 2011/0341* (2013.01); *B60C 2011/0344* (2013.01); *B60C 2011/0369* (2013.01); *B60C 2011/0374* (2013.01); *B60C 2011/1209* (2013.01)

(58) Field of Classification Search
CPC ..... B60C 2011/0369; B60C 2011/0374; B60C 2011/1209; B60C 2011/0339; B60C 2011/0362; B60C 2011/0367; B60C 2011/0355; B60C 11/0311; B60C 11/0302; B60C 11/0306; B60C 11/033; B60C 11/0332; B60C 11/1236; B60C 11/1263; B60C 11/1369; B60C 11/0066; B60C 11/03; B60C 11/12; B60C 11/1218; B60C 2011/0351
USPC .................................................. 152/209.25
See application file for complete search history.

(56) References Cited

U.S. PATENT DOCUMENTS

| | | | | |
|---|---|---|---|---|
| 5,814,169 A | * | 9/1998 | Yamaguchi ............. | B60C 11/11 152/209.2 |
| 5,960,845 A | * | 10/1999 | Wada .................. | B60C 11/0309 152/209.23 |
| 6,571,844 B1 | * | 6/2003 | Ochi ....................... | B60C 11/11 152/209.18 |
| 2005/0167022 A1 | * | 8/2005 | Hashimoto ............. | B60C 11/12 152/209.25 |
| 2009/0078351 A1 | * | 3/2009 | Ebiko ..................... | B60C 11/12 152/209.23 |
| 2011/0073230 A1 | | 3/2011 | Ishiguro et al. | |
| 2011/0088821 A1 | * | 4/2011 | Imakita ............... | B60C 11/0302 152/209.15 |
| 2011/0259494 A1 | * | 10/2011 | Shibano .............. | B60C 11/0306 152/209.22 |

FOREIGN PATENT DOCUMENTS

| | | |
|---|---|---|
| EP | 2230100 A1 | 9/2010 |
| JP | 2-234803 A | 9/1990 |
| JP | 3-112702 A | 5/1991 |
| JP | 4-50004 A | 2/1992 |
| JP | 10-157410 A | 6/1998 |
| JP | 2002-87021 A | 3/2002 |
| JP | 2005-88670 A | 4/2005 |
| JP | 2006-35955 A | 2/2006 |
| JP | 2010-208616 A | 9/2010 |
| JP | 2010-215075 A | 9/2010 |
| JP | 2011-235787 A | 11/2011 |
| KR | 10-0902393 * | 6/2009 |

OTHER PUBLICATIONS

Hara (JP 03-112702, May 14, 1991, machine translation).*
International Preliminary Report on Patentability dated Jun. 11, 2015, issued by the International Bureau in corresponding International Application No. PCT/JP2013/082099.
Communication dated Dec. 5, 2016, from the European Patent Office in European Application No. 13858626.8.
International Search Report of PCT/JP2013/082099, dated Mar. 11, 2014. [PCT/ISA/210].

* cited by examiner

FIG. 3

| | Conventional Example 1 FIG. 2A | Example 1 FIG. 2A | Example 2 FIG. 2A | Example 3 FIG. 2B | Example 4 FIG. 2B | Comparative Example 1 FIG. 2B | Example 5 FIG. 2B | Comparative Example 1 FIG. 2C |
|---|---|---|---|---|---|---|---|---|
| Negative Rate % | 32 | 32 | 32 | 32 | 32 | 32 | 32 | 32 |
| Central Groove (Width/Depth) mm | 4/9 | 10/7 | 14/10 | 5/7 | 10/7 | 11/7 | 4/5 | 4/7 |
| Right and Left Grooves (Width/Depth) mm | — | — | — | 5/7 | 10/7 | 11/7 | 8.5/5 | 8.5/5 |
| S/L | 0.51 | 1.0 | 2.0 | 1.5 | 3.0 | 3.3 | 1.5 | 1.5 |
| Distance of Grooves On Both Sides from Center (Left/Right) mm | — | — | — | 25/25 | 25/25 | 25/25 | 25/25 | 25/20 |
| Wet Steering Stability Performance | 100 | 105 | 106 | 108 | 107 | 107 | 108 | 107 |
| Dry Steering Stability Performance | 100 | 100 | 100 | 100 | 100 | 98 | 105 | 95 |
| Steering Stability Performance on the Snow | 100 | 102 | 103 | 104 | 104 | 104 | 104 | 100 |

| | Example 6 FIG. 2D | Comparative Example 3 FIG. 2B |
|---|---|---|
| Negative Rate % | 32 | 32 |
| Groove (Width/Depth) mm | 10/7 | 5/7 |
| Number of Circumferential Grooves | 2 | 4 |
| S/L | 2.0 | 2.0 |
| Wet Steering Stability Performance | 100 | 95 |
| Steering Stability Performance on the Snow | 100 | 82 |

FIG. 7

| | Conventional Example 1 FIG. 5A | Comparative Example 1 FIG. 5B | Example 1 FIG. 5C | Comparative Example 2 FIG. 5D | Example 2 FIG. 4 | Comparative Example 3 FIG. 6A | Example 3 FIG. 6B | Comparative Example 4 FIG. 6C | Example 4 FIG. 6D | Example 5 FIG. 5C |
|---|---|---|---|---|---|---|---|---|---|---|
| Negative Rate % (Total/Circum./Lug) | (32/3/29) | (32/3/29) | (32/12/20) | (32/12/20) | (32/12/20) | (32/12/20) | (32/12/20) | (32/12/20) | (32/12/20) | (32/12/20) |
| a : b | — | — | 1:1 | 1:1 | 1:0.95 | 1:0.85 | 1:1.05 | 1:1.15 | 1:1 | 1:1 |
| Rectangularity | 100 | 62 | 100 | 100 | 85 | 62 | 105 | 110 | 100 | 100 |
| Distance of Right and Left Grooves from Center (Left/Right) mm | — | — | 25/25 | 50/50 | 25/25 | 25/25 | 25/25 | 25/25 | 25/20 | 25/25 |
| Wet Steering Stability Performance | 100 | 105 | 107 | 99 | 109 | 110 | 105 | 97 | 103 | 107 |
| Dry Steering Stability Performance | 100 | 103 | 102 | 102 | 103 | 104 | 102 | 99 | 102 | 100 |
| Steering Stability Performance on the Snow | 100 | 79 | 100 | 100 | 100 | 77 | 100 | 97 | 100 | 100 |

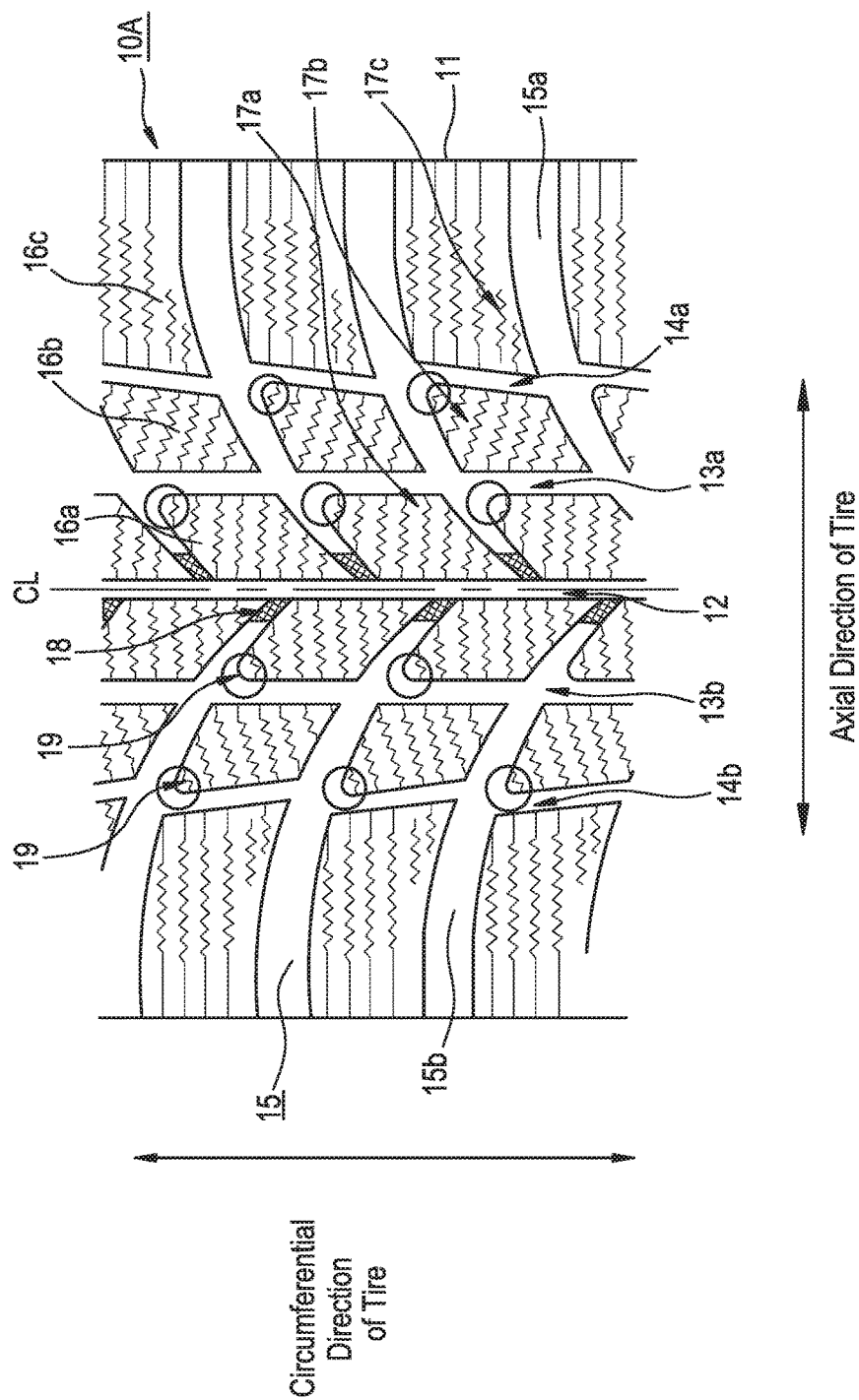

FIG. 16

| | Acceleration Performance On the Snow | Steering Stability Performance On the Snow | Wet Braking Perfomance | Wear Resistance Performance |
|---|---|---|---|---|
| Conventional Example 201 | 100 | 100 | 100 | 100 |
| Comparative Example 201 | 103 | 102 | 102 | 101 |
| Example 201 | 104 | 104 | 110 | 103 |
| Example 202 | 105 | 105 | 111 | 104 |
| Example 203 | 106 | 106 | 112 | 105 |
| Example 204 | 107 | 107 | 110 | 106 |
| Example 205 | 108 | 108 | 102 | 107 |
| Example 206 | 106 | 104 | 103 | 102 |
| Example 207 | 106 | 105 | 108 | 104 |
| Example 208 | 106 | 105 | 112 | 106 |
| Example 209 | 106 | 104 | 110 | 106 |
| Comparative Example 202 | 106 | 102 | 108 | 106 |
| Example 210 | 106 | 104 | 102 | 101 |
| Example 211 | 106 | 105 | 110 | 104 |
| Example 212 | 106 | 105 | 111 | 104 |
| Example 213 | 106 | 102 | 110 | 103 |
| Example 214 | 103 | 104 | 110 | 103 |
| Comparative Example 203 | 102 | 102 | 105 | 101 |
| Example 215 | 108 | 108 | 104 | 101 |
| Example 216 | 107 | 107 | 108 | 104 |
| Example 217 | 105 | 105 | 114 | 106 |
| Example 218 | 104 | 104 | 116 | 107 |
| Example 219 | 101 | 101 | 118 | 108 |
| Example 220 | 107 | 108 | 112 | 105 |
| Example 221 | 109 | 109 | 112 | 105 |
| Example 222 | 106 | 106 | 103 | 107 |
| Example 223 | 106 | 106 | 110 | 106 |
| Example 224 | 106 | 106 | 113 | 103 |
| Example 225 | 106 | 106 | 112 | 102 |
| Example 226 | 106 | 106 | 108 | 101 |
| Example 227 | 106 | 106 | 104 | 104 |
| Example 228 | 106 | 106 | 111 | 105 |
| Example 229 | 107 | 106 | 114 | 105 |
| Example 230 | 107 | 106 | 114 | 103 |

FIG. 17

|  | Acceleration Performance On the Snow | Steering Stability Performance On the Snow | Wet Braking Perfomance | Wear Resistance Performance |
|---|---|---|---|---|
| Example 231 | 103 | 104 | 118 | 111 |
| Example 232 | 104 | 105 | 117 | 110 |
| Example 233 | 105 | 106 | 116 | 109 |
| Example 234 | 106 | 106 | 115 | 108 |
| Example 235 | 106 | 106 | 115 | 108 |
| Example 236 | 106 | 106 | 115 | 108 |
| Example 237 | 105 | 106 | 115 | 107 |
| Example 238 | 104 | 105 | 114 | 106 |
| Example 239 | 106 | 106 | 115 | 108 |
| Example 240 | 105 | 106 | 115 | 108 |
| Example 241 | 104 | 105 | 114 | 106 |
| Example 242 | 106 | 106 | 112 | 106 |
| Example 243 | 106 | 106 | 112 | 106 |
| Example 244 | 106 | 106 | 112 | 107 |
| Example 245 | 106 | 103 | 110 | 107 |
| Example 246 | 108 | 103 | 105 | 107 |
| Example 247 | 107 | 105 | 110 | 106 |
| Example 248 | 106 | 106 | 112 | 106 |
| Example 249 | 106 | 106 | 114 | 109 |
| Example 250 | 105 | 105 | 114 | 109 |
| Example 251 | 103 | 103 | 113 | 107 |
| Example 252 | 106 | 106 | 112 | 105 |
| Example 253 | 106 | 106 | 113 | 105 |
| Example 254 | 106 | 106 | 114 | 105 |
| Example 255 | 106 | 106 | 113 | 104 |
| Example 256 | 106 | 106 | 112 | 103 |
| Example 257 | 106 | 106 | 115 | 108 |
| Example 258 | 106 | 106 | 116 | 109 |
| Example 259 | 105 | 106 | 117 | 110 |
| Example 260 | 106 | 106 | 111 | 105 |
| Example 261 | 106 | 106 | 113 | 106 |
| Example 262 | 106 | 107 | 114 | 104 |

FIG. 18

|  | Acceleration Performance On the Snow | Steering Stability Performance On the Snow | Wet Braking Perfomance | Wear Resistance Performance |
| --- | --- | --- | --- | --- |
| Conventional Example 301 | 100 | 100 | 100 | 100 |
| Comparative Example 301 | 103 | 102 | 102 | 101 |
| Example 301 | 104 | 104 | 110 | 103 |
| Example 302 | 105 | 105 | 111 | 104 |
| Example 303 | 106 | 106 | 112 | 105 |
| Example 304 | 107 | 107 | 110 | 106 |
| Example 305 | 108 | 108 | 102 | 107 |
| Example 306 | 106 | 104 | 103 | 102 |
| Example 307 | 106 | 105 | 108 | 104 |
| Example 308 | 106 | 105 | 112 | 106 |
| Example 309 | 106 | 104 | 110 | 106 |
| Comparative Example 302 | 106 | 102 | 108 | 106 |
| Example 310 | 106 | 104 | 102 | 101 |
| Example 311 | 106 | 105 | 110 | 104 |
| Example 312 | 106 | 105 | 111 | 104 |
| Example 313 | 106 | 102 | 110 | 103 |
| Example 314 | 103 | 104 | 110 | 103 |
| Comparative Example 303 | 102 | 102 | 105 | 101 |
| Example 315 | 108 | 108 | 104 | 101 |
| Example 316 | 107 | 107 | 108 | 104 |
| Example 317 | 105 | 105 | 114 | 106 |
| Example 318 | 104 | 104 | 116 | 107 |
| Example 319 | 101 | 101 | 118 | 108 |
| Example 320 | 107 | 108 | 112 | 105 |
| Example 321 | 109 | 109 | 112 | 105 |
| Example 322 | 106 | 106 | 103 | 107 |
| Example 323 | 106 | 106 | 110 | 106 |
| Example 324 | 106 | 106 | 113 | 103 |
| Example 325 | 106 | 106 | 112 | 102 |
| Example 326 | 106 | 106 | 108 | 101 |
| Example 327 | 106 | 106 | 104 | 104 |
| Example 328 | 106 | 106 | 111 | 105 |
| Example 369 | 107 | 106 | 114 | 105 |
| Example 330 | 107 | 106 | 114 | 103 |

FIG. 19

| | Acceleration Performance On the Snow | Steering Stability Performance On the Snow | Wet Braking Perfomance | Wear Resistance Performance |
|---|---|---|---|---|
| Example 331 | 103 | 104 | 118 | 111 |
| Example 332 | 104 | 105 | 117 | 110 |
| Example 333 | 105 | 106 | 116 | 109 |
| Example 334 | 106 | 106 | 115 | 108 |
| Example 335 | 106 | 106 | 115 | 108 |
| Example 336 | 106 | 106 | 115 | 108 |
| Example 337 | 105 | 106 | 115 | 107 |
| Example 338 | 104 | 105 | 114 | 106 |
| Example 339 | 106 | 106 | 115 | 108 |
| Example 340 | 105 | 106 | 115 | 108 |
| Example 341 | 104 | 105 | 114 | 106 |
| Example 342 | 106 | 106 | 112 | 106 |
| Example 343 | 106 | 106 | 112 | 106 |
| Example 344 | 106 | 106 | 112 | 107 |
| Example 345 | 106 | 103 | 110 | 107 |
| Example 346 | 108 | 103 | 105 | 107 |
| Example 347 | 107 | 105 | 110 | 106 |
| Example 348 | 106 | 106 | 112 | 106 |
| Example 349 | 106 | 106 | 114 | 109 |
| Example 350 | 105 | 105 | 114 | 109 |
| Example 351 | 103 | 103 | 113 | 107 |
| Example 352 | 106 | 106 | 112 | 105 |
| Example 353 | 106 | 106 | 113 | 105 |
| Example 354 | 106 | 106 | 114 | 105 |
| Example 355 | 106 | 106 | 113 | 104 |
| Example 356 | 106 | 106 | 112 | 103 |
| Example 357 | 106 | 106 | 115 | 108 |
| Example 358 | 106 | 106 | 116 | 109 |
| Example 359 | 105 | 106 | 117 | 110 |
| Example 360 | 106 | 106 | 111 | 105 |
| Example 361 | 106 | 106 | 113 | 106 |
| Example 362 | 106 | 107 | 114 | 104 |

PNEUMATIC TIRE HAVING LUG GROOVES FORMING A DIRECTION TREAD PATTERN

CROSS REFERENCE TO RELATED APPLICATIONS

This application is a National Stage of International Application No. PCT/JP2013/082099 filed Nov. 28, 2013, claiming priority based on Japanese Patent Application No. 2012-263816, filed Nov. 30, 2012, the contents of all of which are incorporated herein by reference in their entirety.

TECHNICAL FIELD

The present invention relates to a pneumatic tire having circumferential grooves and lug grooves formed in the tread surface and, more particularly, to a pneumatic tire which excels in steering stability.

BACKGROUND ART

Conventionally, attempts have been made to improve the steering stability performance of tires by providing, in the tread surface, circumferential grooves extending circumferentially around the tire and lug grooves extending in such a manner as to intersect with the circumferential direction, which ensures the braking performance by the edge effect of the blocks (see Patent Document 1, for instance).

CONVENTIONAL ART

Patent Document

Patent Document 1: Japanese Unexamined Patent Application Publication No. 2009-101740

SUMMARY OF THE INVENTION

To improve the steering stability performance on dry road surfaces, it is necessary to make the ground contact area larger to secure the block rigidity. On the other hand, to improve the steering stability performance on wet road surfaces, it is necessary to increase the number of grooves and raise the drainage (dewatering) performance.

The above two performances are in a trade-off relationship with each other. That is, an attempt at improving the steering stability performance on wet road surfaces may result in a drop in the steering stability performance on dry road surfaces.

Also, the so-called round ground contact shape is advantageous in improving the steering stability performance on wet road surfaces. However, the tires having such a ground contact shape tend generally to show inferior steering stability performance and wear resistance performance on dry road surfaces.

The present invention has been made in view of these conventional problems, and an object thereof is to provide a pneumatic tire that can not only ensure the steering stability performance on wet road surfaces, but also improve the steering stability performance and wear resistance performance on dry road surfaces.

Means for Solving the Problem

Through careful investigations, the inventors of the present invention have come to realize that the tires for ordinary passenger vehicles, subject to high contact pressures in the shoulder regions thereof, tend to have water within the contact patch flowing toward the central region thereof on wet roads. And when the drainage performance of the tire is low, the water from the central region spreads over the tread surface. And upon further investigating the groove cross-sectional areas necessary for expelling the gathering water, they have found that the water entering into the central region can be effectively drained (dewatered) without drops in block rigidity if a relationship of "$1 \leq (S/L) \leq 3$" is satisfied where S is the total of the cross-sectional areas of circumferential grooves disposed in the central region and L is the length of the central region.

That is, the present invention provides a pneumatic tire having, in the surface of the tread, lug grooves on one side extending from one axial edge towards the axial center of the tire in such a manner as to intersect with the circumferential direction thereof and lug grooves on the other side extending in a symmetrically opposite direction from the axial center towards the other axial edge of the tire and at least one circumferential groove extending circumferentially around the tire. And, of the tire, the axial length (width of the central region) L of the central region and the total S of the groove cross-sectional areas of the circumferential grooves disposed in the central region satisfy a relationship of "$1 \leq (S/L) \leq 3$". Here, the central region is a region enclosed by two straight parallel lines each passing through the center between the contact width center and the contact edge with shoulder regions being regions outside of the straight lines.

The groove area meant herein is the groove area in the tread pattern of the tire developed into a plane. Also, when the ratio of the groove area to the total area of the tread pattern is defined as a negative rate (groove area/total pattern area), the relationship between the above-mentioned groove areas is such that "negative rate of lug grooves negative rate of circumferential grooves".

It is to be noted that the lug grooves consisting of lug grooves extending diagonally right up and lug grooves extending diagonally left up having their respective axial center side openings in circumferentially staggered positions, as shown in FIG. 1, are also considered to belong to "lug grooves consisting of lug grooves on one side extending from one axial edge toward the axial center thereof in such a manner as to intersect with the circumferential direction thereof and lug grooves on the other side extending in a symmetrically opposite direction from the axial center toward the other axial edge thereof".

BRIEF DESCRIPTION OF THE DRAWINGS

FIG. 3 is a table showing the results of running tests.

FIG. 7 is a table showing the results of running tests.

FIG. 8 is an illustration showing a tread pattern of a pneumatic tire according to the third embodiment of the present invention.

FIG. 16 is a table showing the results of running tests (Examples 201 to 230).

FIG. 17 is a table showing the results of running tests (Examples 231 to 262).

FIG. 18 is a table showing the results of running tests (Examples 301 to 330).

FIG. 19 is a table showing the results of running tests (Examples 331 to 362).

BEST MODE FOR CARRYING OUT THE INVENTION

First Embodiment

Figure 1:
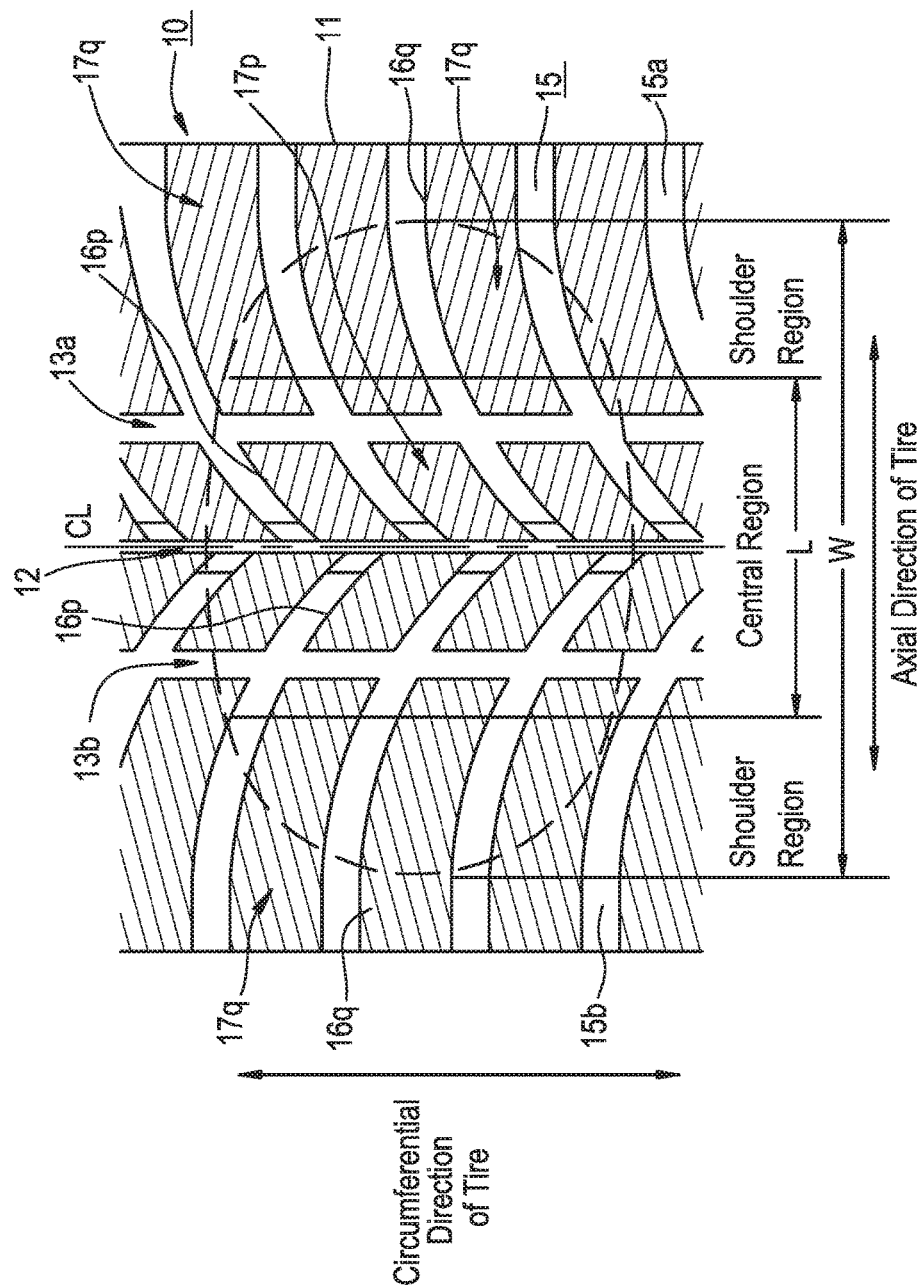
FIG. 1 is an illustration showing a tread pattern of a pneumatic tire according to the first embodiment of the present invention.

FIG. 1 is an illustration showing an example of a tread pattern of a tread 11 of a pneumatic tire (hereinafter referred to as a tire) 10 according to a first embodiment of the present invention. The vertical direction of the illustration is the circumferential direction of the tire, and the horizontal direction the axial direction of the tire.

The tire 10 has at least one layer of carcass toroidally straddling between a pair of beads as the framework. At least one layer of a belt layer is disposed radially outside of the crown part of the carcass. And a tread pattern as shown in FIG. 1 is formed in a surface of tread rubber which is disposed radially outside of the belt layer.

Hereinafter, the region enclosed by two straight parallel lines each passing through the center between the straight line (CL: center line) passing through the contact width center and the contact edge of the contact patch of the tire indicated by a thick broken line in FIG. 1 will be referred to as the central region, and the regions axially outside of the central region as the shoulder regions. The axial length L of the central region is about 50% of the contact width W.

Formed in the central region of the tread 11 are three circumferential grooves 12, 13a, and 13b and lug grooves 15. The three circumferential grooves 12, 13a, and 13b are each a straight groove extending continuously around the circumference of the tire. In the present embodiment, the groove width of the circumferential groove 12 is formed narrower than the groove width of the circumferential grooves 13a and 13b which are located laterally next to (outside of) the circumferential groove 12.

The lug grooves 15 are approximately V-shaped grooves consisting of right-side lug grooves 15a, which extend from one axial edge (right side here) toward the axial center of the tire in such a manner as to intersect with the circumferential direction of the tire and opening into the circumferential groove 12 located in the center, and left-side lug grooves 15b, which extend from the other axial edge (left side here) toward the axial center of the tire in such a manner as to intersect with the circumferential direction of the tire and opening into the circumferential groove 12 in the center. The right-side lug grooves 15a and the left-side lug grooves 15b are each an arc-like groove. In the pattern shown in FIG. 1, the right-side lug grooves 15a extend diagonally right up from the circumferential groove 12 located in the center toward the axially outer side of the tire, whereas the left-side lug grooves 15b extend diagonally left up.

The surface of the tread 11 is demarcated into a plurality of blocks 16 (16p, 16q) by the three circumferential grooves 12, 13a, 13b and the lug grooves 15. Provided on the ground contact surface side of each of the blocks 16p and 16q are a plurality of linear sipes (2D sipes) 17p and 17q. The sipe angle, which is an angle between the extension direction of the sipes 17p and 17q and the circumferential direction of the tire, is 75°.

In the present embodiment, as shown in FIG. 1, the three circumferential grooves 12, 13a, and 13b are all disposed within the central region. At the same time, the relationship between the total S of the groove sectional areas of the three circumferential grooves 12, 13a, and 13b and the length L of the central region (about half of contact width) is so set that $1 \leq (S/L) \leq 3$.

That is, when S/L<1, the block rigidity can be retained, so that the steering stability performance on dry roar surfaces can be secured. However, the drainage effect of the central region may not be sufficient with the result of lowered steering stability performance on wet road surfaces. On the other hand, when S/L>3, the steering stability performance on wet road surfaces improve, but the block rigidity drops.

Therefore, it is necessary to set S and L in the range of "$1 \leq (S/L) \leq 3$" if the water entering into the central region is to be drained effectively without a drop in block rigidity.

In this way, the water entering into the central region can be drained effectively while retaining the block rigidity, so that the steering stability performance on dry road surfaces and the steering stability performance on wet road surfaces of the tire 10 can both be achieved.

Also, the three circumferential grooves formed in the central region help retain proper block rigidity of the central region and ensure constant steering stability performance even on wet road surfaces with much water.

In this arrangement, it is preferable that the cross-sectional area of the laterally located circumferential grooves 13a and 13b is larger than the cross-sectional area of the centrally located circumferential groove 12.

That is, the steering stability performance on wet road surfaces has nothing to do with the difference in cross-sectional area of the circumferential grooves 12, 13a, 13b as long as the total S of the groove sectional areas of the circumferential grooves disposed in the central region and the width L of the central region satisfy the relation of "$1 \leq (S/L) \leq 3$". And if the cross-sectional area of the circumferential groove 12 located in the center is made smaller, then the rigidity of the central region having a longer contact length can be increased. Therefore, the steering stability performance on dry road surfaces can be further improved if S/L is set within the above-mentioned range and the cross-sectional area of the circumferential grooves 13a and 13b located in outward positions is made larger than the cross-sectional area of the circumferential groove 12 located in the center. Also, it is preferable that the interval between the centrally located circumferential groove 12 and the laterally located circumferential grooves 13a and 13b, respectively, is equal on the right and left sides for easy drainage of water from the central region. This will further improve the steering stability performance on wet road surfaces.

It is to be noted that the number of circumferential grooves disposed in the central region, which is three in the first embodiment, may be one, two, or four or more. However, if the number of circumferential grooves is small, a sufficient improvement in the wet performance on roads with much water cannot be expected. On the other hand, four or more circumferential grooves will make the block width in the central region narrower, which lowers the steering stability performance on dry road surfaces. Therefore, to improve both the steering stability performance on dry road surfaces and the steering stability performance on wet road surfaces, it is preferable that the number of circumferential grooves to be disposed in the central region is three.

Also, the circumferential grooves, which are disposed only in the central region in the first embodiment, may be disposed in the shoulder regions also. However, in such a case, too, it goes without saying that the total S of the groove sectional areas of the circumferential grooves disposed within the central region and the length L of the central region must be set within the range of "$1 \leq (S/L) \leq 3$" as in the first embodiment.

Examples (1)

Figure 2A:
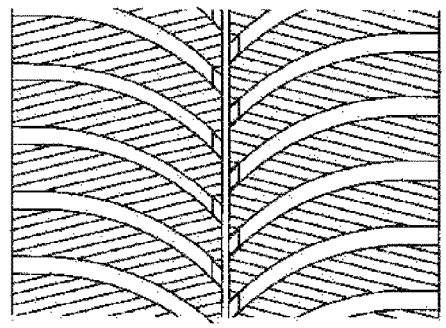
FIGS. 2A, 2B, 2C, 2D and 2E are illustrations showing tread patterns of tires according to Examples (1).

Tires featuring "$1 \leq (S/L) \leq 3$" according to the present invention (Examples 1 to 6) and a conventional tire featuring S/L of less than 1 (Conventional Example) as shown in FIG. 2A were prepared. The table of FIG. 3 shows the results of the steering stability performance tests performed by operating the test vehicles fitted with the respective tires on wet road surfaces, dry road surfaces, and snowy road surfaces. Also, shown for comparison are the results of similar tests on the tire featuring S/L of 3 or higher (Comparative Example 1), the tire having different intervals between the circumferential groove located in the center and the circumferential grooves located in outer positions on the right and left (Comparative Example 2), and the tire having four circumferential grooves (Comparative Example 3).

For the steering stability performance on wet road surfaces, the steering stability performance on dry road surfaces, and the steering stability performance on the snow, the evaluation was made by measuring the lap time when the test vehicles were driven by evaluation drivers over courses for evaluation of steering stability performance. In the wet braking performance tests, the evaluation was made by spraying water to a depth of 2 mm on the paved road. The test results are all represented by index numbers with respect to 100 for the results of Conventional Example. The larger the index numbers, the better for any of the above-cited performances.

The tire size of the tire used is 195/65R15, the rim used is 6J-15, and the internal pressure is 200 kPa. Note that the rim and the internal pressure were selected in compliance with the applicable rim corresponding to the size of radial ply tire and the air pressure—load capacity correspondence table as defined by JATMA YEAR BOOK (2011 Standard of Japan Automobile Tire Manufacturers Association).

Also, the groove depth of the blocks of each tire is 9 mm, and the sipe depth is all 6 mm. The pattern shapes are set as shown in FIGS. 2A to 2E. The negative rate is all 32%.

As shown in FIG. 2A, the tire of Conventional Example has V-shaped lug grooves from contact edge to contact edge and a single circumferential groove in the center of the contact patch. The contact width of the tire when placed on a flat and smooth road surface at an internal pressure of 200 kPa and a load of 5500 N is 140 mm. The sipe angle is 75°.

The groove width of the circumferential groove is 4 mm, and the depth thereof 9 mm. Hence, $S/L=4 \times 9/70=0.51$.

Figure 2B:
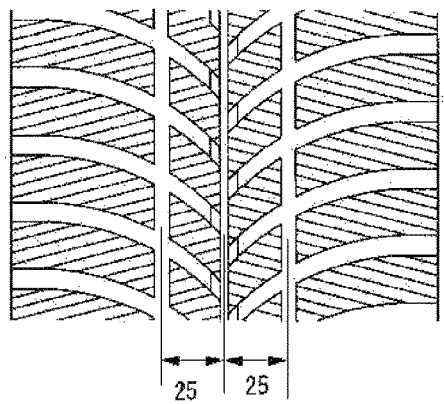
Figure 2C:
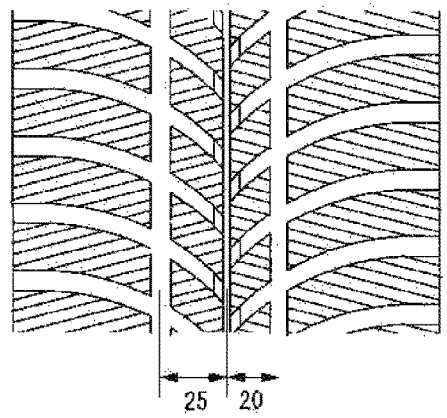
Figure 2D:
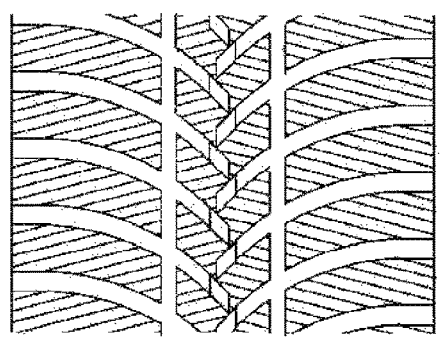
Figure 2E:
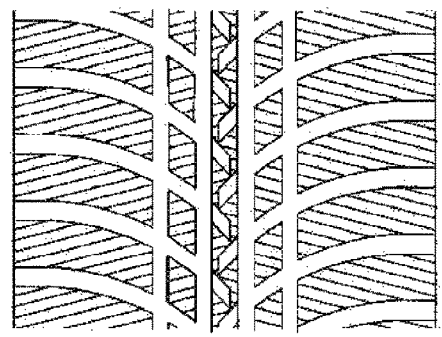

The tread pattern of Example 1 is the same as that of Conventional Example, with the groove width of the circumferential groove being 10 mm and the depth thereof 7 mm. Accordingly, $S/L=10 \times 7/70=1.0$. The tread pattern of Example 2 is also the same as that of Conventional Example, but the groove width of the circumferential groove is 14 mm and the depth thereof 10 mm. Hence, $S/L=14 \times 10/70=2.0$. Example 3, as shown in FIG. 2B, has a circumferential groove in the center of the contact patch with a groove width of 5 mm and a depth of 7 mm and one each of the circumferential grooves added on both sides of the central circumferential groove with a groove width of 5 mm and a depth of 7 mm. Hence, $S/L=5 \times 7 \times 3/70=1.5$. It is to be noted that the two added grooves are located such that the centers thereof are at 25 mm from the center. Thus, $S/L=5 \times 7 \times 3/70=1.5$. The tread pattern of Example 4 is the same as that of Example 3, with the groove width of the circumferential groove at the contact patch center being 10 mm and the depth thereof 7 mm and the groove width of the two circumferential grooves disposed on both sides being 10 mm and the depth thereof 7 mm. Hence, $S/L=10 \times 7 \times 3/70=3.0$. The tread pattern of Comparative Example 1 is the same as that of Example 3, with all the groove widths of the three circumferential grooves being 11 mm and the depth thereof 7 mm and the groove width of the two circumferential grooves disposed on both sides being 10 mm and all the depths thereof 7 mm. Hence, $S/L=11 \times 7 \times 3/70=3.3$. The tread pattern of Example 5 is the same as that of Example 3, with the groove width of the central circumferential groove being 4 mm and the depth thereof 5 mm and the groove width of the circumferential grooves on both sides being 8.5 mm and the depth thereof 5 mm. Hence, $S/L=(4 \times 5+8.5 \times 5 \times 2)/70=1.5$. Comparative Example 2, as shown in FIG. 2C, is the same as Example 5, in which the position of the circumferential groove on the right side is shifted 5 mm toward the center. Also, Example 6, as shown in FIG. 2D, has two circumferential grooves, with the groove width of the circumferential grooves being 10 mm and the depth thereof 7 mm. Note that the width of the center ribs (land portions) is 25 mm. Comparative Example 3, as shown in FIG. 2E, has four circumferential grooves, with the groove width of the circumferential grooves being 5 mm and the depth thereof 7 mm. Note that the width of the center ribs (land portions) is 10 mm.

As is clear from the table of FIG. 3, Examples 1 to 5 featuring "$1 \leq (S/L) \leq 3$" all showed equal or superior steering stability performance on dry road surfaces to that of Conventional Example and improved steering stability performance on wet road surfaces and steering stability performance on the snow upon those of the Conventional Example tire. In particular, it has been found that the tire of Example 5, which has the cross-sectional area of the circumferential grooves located in outward positions set larger than the cross-sectional area of the circumferential groove located in the center, show improvements in steering stability performance on all the road surfaces tested on Conventional Example.

In contrast to this, the tire of Comparative Example 1 featuring larger groove sectional area and S/L>3 showed improved steering stability performance on wet road surfaces and steering stability performance on the snow upon Conventional Example but inferior steering stability performance on dry road surfaces to Conventional Example.

Thus, it has been confirmed that the relationship of "$1 \leq (S/L) \leq 3$" improves the steering stability performance on any of the wet road surface, dry road surface, and snowy road surface. Also, if one of the outside circumferential grooves is shifted toward the center as with Comparative Example 2, then the steering stability performance on wet road surfaces will improve on that of Conventional Example, but the steering stability performance on dry road surfaces will decline. Accordingly, it has been confirmed that the distance between the circumferential grooves on the right and left and the central circumferential groove is preferably the same.

It is to be noted that the steering stability performance of the tire with two grooves in the central region as with Example 6 remained the same as that of Conventional Example, but the steering stability performance of the tire with four grooves in the central region as with Example 3 dropped from that of Conventional Example. Therefore, it has been confirmed that the optimum number of grooves in the central region is three.

Second Embodiment

FIG. 1 is an illustration showing a pneumatic tire (hereinafter referred to as a tire) 10Z according to a second embodiment of the present invention. And the outline of the ground contact shape of the tire 10Z is delineated by a thick solid line in the figure.

The tread pattern of the tire 10Z is the same as that of the tire 10 shown in FIG. 1, with three circumferentially continuous circumferential grooves (circumferential grooves 12, 13a, 13b) formed in the central region and V-shaped lug grooves 15.

Hereinafter, of the blocks 16, the blocks 16p defined by the circumferential groove 12 located in the center, the circumferential groove 13a (or circumferential groove 13b), and the lug grooves 15 will be referred to as the inner blocks, and the blocks 16q defined by the circumferential groove 13a (or circumferential groove 13b) located outside and the lug grooves 15 will be referred to as the outer blocks.

Figure 4:
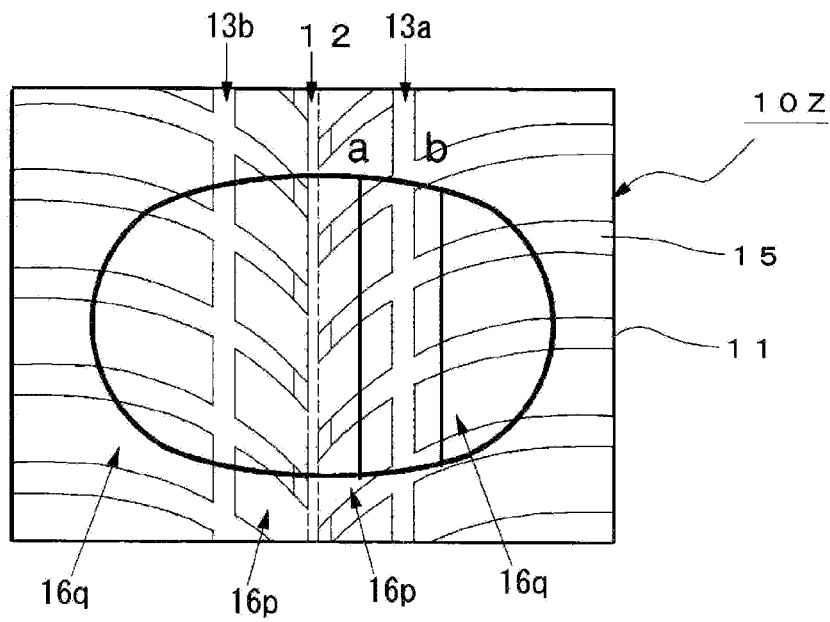
FIG. 4 is an illustration showing a tread pattern of a pneumatic tire according to the second embodiment of the present invention.

The tire 10Z of this embodiment has a ground contact shape, of which the average contact length a, which is the average contact length of the inner blocks 16p inside the contact patch enclosed by the thick solid line in FIG. 4, and the average contact length b, which is the average contact length of the outer blocks 16q, are nearly the same with each other (0.9·a<b<1.1·a).

The ground contact shape featuring simply a≈b in the central region tends to excel in wear resistance performance by virtue of a small radius difference of the tire in the central region, but is subject to lowered wet braking performance due to a drop in the draining effect of the contact patch. But as with the tire 10Z of the present embodiment, a plurality (three here) of circumferentially continuous circumferential grooves are disposed in the central region, and the ground contact shape features the relationship between the average contact length a and the average contact length b of "0.9·a<b<1.1·a". This makes it possible to drain water entering into the central region effectively. Thus it is possible to produce a pneumatic tire having a high wet braking performance while retaining an excellent wear resistance performance.

When the average contact length b is 90% or less of the average contact length a, the radius difference of the tire becomes large in the central region. As a result, the draining effect at the contact patch rises, but the wear resistance performance drops. On the other hand, when the average contact length b is 110% or more of the average contact length a, the wear resistance performance may excel, but the draining effect at the contact patch drops. Hence, even when a plurality of circumferentially continuous circumferential grooves are disposed in the central region, the wet braking performance cannot be secured. Accordingly, if both the steering stability performance and wear resistance performance are to be realized at the same time, it is necessary to satisfy "0.9·a<b<1.1·a".

Also, it is of primary importance that the three circumferential grooves (circumferential grooves 12, 13a, 13b) are located within the central region which has long contact lengths. This will allow water to be drained effectively and secure the steering stability performance on wet road surfaces at a minimum negative rate. Accordingly, it is possible to realize high steering stability performance on dry road surfaces also.

At this time, it is preferable that the cross-sectional area of the centrally located circumferential groove 12 is smaller than the cross-sectional area of the outwardly located circumferential grooves 13a and 13b.

That is, the steering stability performance on wet road surfaces have nothing to do with the difference in cross-sectional area between the circumferential grooves, 12, 13a, 13b. But making the cross-sectional area of the centrally located circumferential groove 12 smaller can raise the rigidity of the central region which has longer average contact lengths. Thus the steering stability performance on dry road surfaces can be further improved.

In this manner, by making the cross-sectional area of the outwardly located circumferential grooves 13a and 13b larger than the cross-sectional area of the centrally located circumferential groove 12, the steering stability performance on dry road surfaces can be further improved while retaining the steering stability performance on wet road surfaces.

Also, it is preferable that the interval between the centrally located circumferential groove 12 and the outwardly located circumferential grooves 13a and 13b, respectively, is the same on the right and left for easier draining of water from the central region. This will further improve the steering stability performance on wet road surfaces.

It is to be noted that the circumferential grooves, which are disposed in the central region only in the second embodiment, may be disposed in the shoulder regions also. However, in this case, too, it goes without saying that the ground contact shape must be such that the average contact length a of the inner blocks 16p inside the contact patch and the average contact length b of the outer blocks 16q are in a relationship of "0.9·a<b<1.1·a".

Examples (2)

Tires having three circumferential grooves in the central region and featuring a ground contact shape with the average contact length a and the average contact length b being in a relationship of "0.9·a<b<1.1·a" according to the present invention (Examples 1 to 5) and a conventional tire having a single circumferential groove (Conventional Example) were prepared. The table of FIG. 7 shows the results of the steering stability performance tests performed by operating the test vehicles fitted with the respective tires on wet road surfaces, dry road surfaces, and snowy road surfaces. Also, shown for comparison are the results of similar tests on the tire having the contact shape of Conventional Example rounded (Comparative Example 1), the tire having outwardly located circumferential grooves in the shoulder regions (Comparative Example 2), the tire featuring the average contact length b being 90% or less of the average contact length a (Comparative Example 3), and the tire featuring the average contact length b being 110% or more of the average contact length a (Comparative Example 4).

For the steering stability performance on wet road surfaces, the steering stability performance on dry road surfaces (DRY), and the steering stability performance on the snow, the evaluation was made by measuring the lap time when the test vehicles were driven by drivers over courses for evaluation of steering stability performance. In the wet braking performance tests, the evaluation was made by spraying water to a depth of 2 mm on the paved road. The test results are all represented by index numbers with respect to 100 for the results of Conventional Example. The larger the index numbers, the better for any of the above-cited performances.

The tire size of the tire used was 195/65R15, the rim used was 6J-15, and the internal pressure was 200 kPa. Note that the rim and the internal pressure were selected in compliance with the applicable rim corresponding to the size of radial ply tire and the air pressure—load capacity correspondence table as defined by JATMA YEAR BOOK (2011 Standard of Japan Automobile Tire Manufacturers Association).

Also, the groove depth of the blocks of each tire was 9 mm, and the sipe depth was all 6 mm. The negative rate was 32%. The pattern shapes will be discussed later.

Figure 5A:
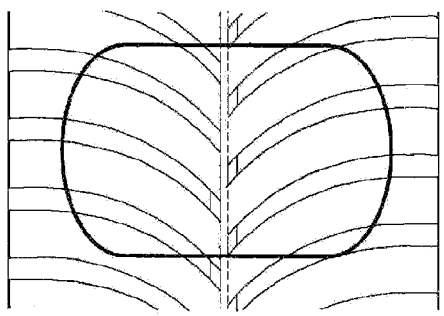
FIGS. 5A, 5B, 5C and 5D are illustrations showing tread patterns of tires according to Examples (2).

As shown in FIG. 5A, the tire of Conventional Example had V-shaped lug grooves from contact edge to contact edge and a single circumferential groove in the center of the contact patch. The contact width of the tire when placed on a flat and smooth road surface at an internal pressure of 200 kPa and a load of 5500 N was 140 mm. The sipe angle was 75°.

The groove width of the circumferential groove was 4 mm, and the depth thereof 9 mm.

Figure 5B:
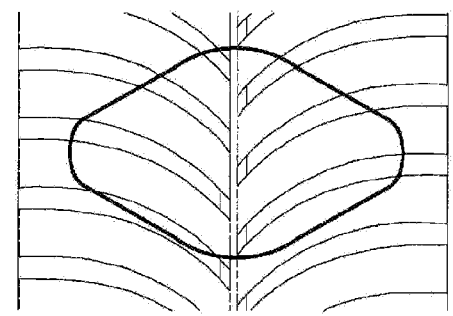
Figure 5C:
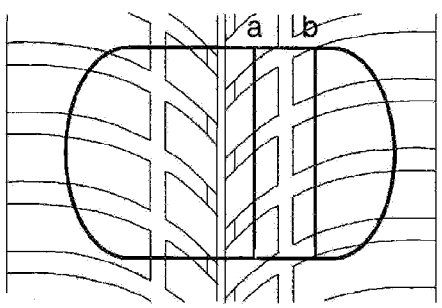
Figure 5D:
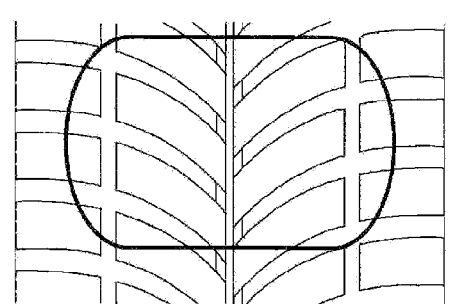
Figure 6A:
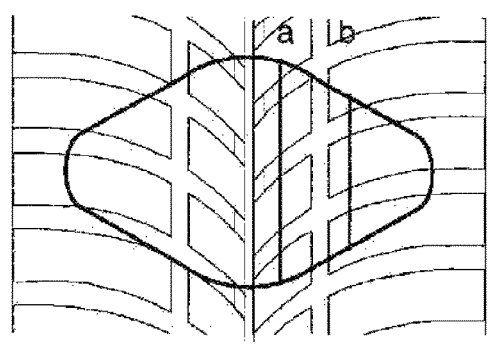
FIGS. 6A, 6B, 6C and 6D are illustrations showing tread patterns of tires according to Examples (2).
Figure 6B:
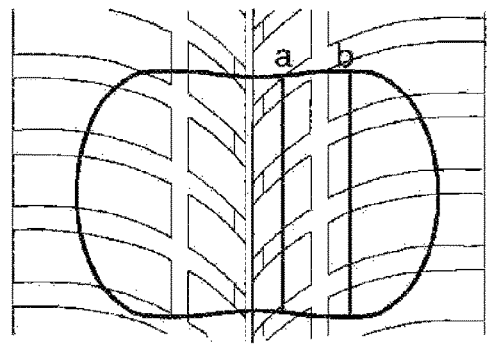

Comparative Example 1, as shown in FIG. 5B, has the ground contact shape made rounder than that of Conventional Example. Note that the rectangularity of Comparative Example 1 is 62 with respect to 100 of Conventional Example. Example 1, as shown in FIG. 5C, has one each of the continuous circumferential grooves with a groove width of 6 mm and a depth of 9 mm added on each side of the circumferential groove in the center of the contact patch. The two added grooves are so disposed that each center thereof is located at 25 mm from the center of the contact patch, and the ratio of the average contact length a of the inner blocks to the average contact length b of the outer blocks is "a:b=1:1". Comparative Example 2, as shown in FIG. 5D, has the centers of the two added grooves located outside of the central region (50 mm from the center of the contact patch) in contrast to Example 1. Example 2, as shown in FIG. 4, has a ground contact shape slightly rounder than that of Example 1 and slightly more square than that of Comparative Example 1 with "a:b=1:0.95". The rectangularity of Comparative Example 2 is 85. Example 3, as shown in FIG. 6A, has a ground contact shape identical to that of Comparative Example 1 (rectangularity: 62) with "a:b=1: 0.85". Example 3, as shown in FIG. 6B, has a ground contact shape slightly butterfly-shaped with "a:b=1:1.05". The rectangularity of Example 3 is 105.

Figure 6C:
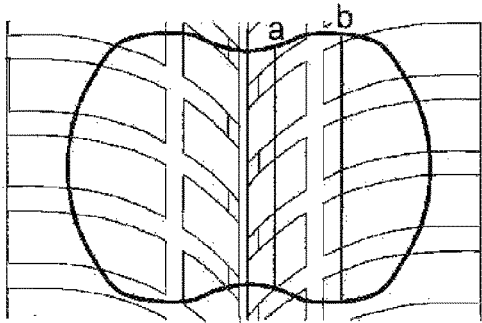
Figure 6D:
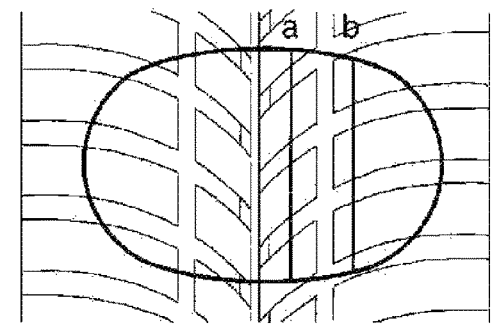

Comparative Example 5, as shown in FIG. 6C, has a butterfly-shaped ground contact shape with "a:b=1:1.15". The rectangularity of Example 3/Comparative Example 5 is 110. Example 4, as shown in FIG. 6D, has the right-side groove of the two added grooves 5 mm shifted toward the center of the contact patch in contrast to Example 1. Example 5 is the same as Example 1 except that the groove width of the circumferential grooves is all 5.3 mm, and the depth thereof 8.3 mm.

As is clear from the table of FIG. 7, the tires (Examples 1 to 5) having three circumferential grooves in the central region and featuring a ground contact shape with the average contact length a and the average contact length b being in a relationship of "0.9·a<b<1.1·a" all showed the steering stability performance on dry road surfaces and snowy road surfaces improved on those of the Conventional Example tire.

In contrast to this, Comparative Example 1 and Comparative Example 3, both with rounded ground contact shape, showed the steering stability performance on wet road surfaces and dry road surfaces improved on those of Conventional Example, but markedly reduced steering stability performance on the snow. By this, it has been confirmed that the tires with roundish ground contact shape, of which the average contact length b is 90% or less of the average contact length a, present inferior steering stability performance on the snow.

Also, Comparative Example 2, which has only one circumferential groove in the central region despite the presence of three circumferential grooves, showed no difference from Conventional Example. Thus, it has been confirmed that there must be three circumferential grooves in the central region. Also, it has been confirmed that the steering stability performance on the snow drops when the average contact length b is 90% or less of the average contact length a as with Comparative Example 3 and that the steering stability performance on the snow and the steering stability performance on wet road surfaces decline when the average contact length b is 110% or more of the average contact length a as with Comparative Example 4. Also, it has been confirmed that as with Example 4, if the right-side groove is shifted toward the center of the contact patch, the steering stability performance will become lower than that of tires with right and left grooves formed symmetrical to each other and that if the groove widths of the circumferential grooves are all the same, then the steering stability performance will become lower than that of tires having a narrower groove width of the circumferential groove in the center of the contact patch.

Third Embodiment

FIG. 8 is an illustration showing an example of a tread pattern of a tread 11 of a pneumatic tire (hereinafter referred to as a tire) 10A according to this embodiment of the present invention.

Formed in the surface of the tread 11 are a central circumferential groove 12, intermediate circumferential grooves 13a, 13b, shoulder grooves 14a, 14b, and lug grooves 15. The central circumferential groove 12 and the intermediate circumferential grooves 13a, 13b are circumferential grooves disposed in the central region and extending continuously along the circumference of the tire. In the present embodiment, the groove width of the intermediate circumferential grooves 13a, 13b is set wider than the width of the central circumferential groove 12.

The shoulder grooves 14a, 14b are circumferential grooves provided axially outside of the intermediate circumferential grooves 13a and 13b respectively and extending discontinuously in their approximately circumferential directions. And they are formed in the shoulder regions within the contact patch of the tire 10A.

The "groove extending continuously" meant here is a groove extending in the circumferential direction of the tire without turning away from it. And the "groove extending discontinuously" meant here is a groove extending obliquely to the circumferential direction of the tire (The angle between the extension direction of the groove and the circumferential direction of the tire is not 0°).

In the present embodiment, the shoulder grooves 14a, 14b are each formed about 4° inclined with respect to the circumferential direction of the tire.

The lug grooves 15 are approximately V-shaped grooves consisting of right-side lug grooves 15a, which extend from one axial edge (right side here) toward the axial center of the tire in such a manner as to intersect with the circumferential direction of the tire and opening into the central circumferential groove 12, and left-side lug grooves 15b, which extend from the other axial edge (left side here) toward the axial center of the tire in such a manner as to intersect with the circumferential direction of the tire and opening into the central circumferential groove 12. The right-side lug grooves 15a and the left-side lug grooves 15b are each an arc-like groove formed such that the groove width is gradually wider axially outward from the central circumferential groove 12. In the pattern shown in FIG. 8, the right-side lug grooves 15a extend diagonally right up from the central circumferential groove 12 toward the axially outer side of the tire, whereas the left-side lug grooves 15b extend diagonally left up.

Hereinbelow, when no distinction is made between right and left, the intermediate circumferential grooves 13a, 13b are referred to as the intermediate circumferential grooves 13, and the shoulder grooves 14a, 14b as the shoulder grooves 14.

The surface of the tread 11 is demarcated into a plurality of blocks 16 (16a to 16c) by the central circumferential groove 12, the intermediate circumferential grooves 13, the shoulder grooves 14, and the lug grooves 15 disposed therein. The blocks 16a defined by the central circumferential groove 12, the intermediate circumferential grooves 13, and the lug grooves 15 and disposed in the central region of the tire 10 are referred to as the central blocks, the blocks 16c defined by the shoulder grooves 14, and the lug grooves 15 and disposed in the shoulder regions of the tire 10 as the shoulder blocks, and the blocks 16b defined by the intermediate circumferential grooves 13, the shoulder grooves 14, and the lug grooves 15 and disposed between the central blocks 16a and the shoulder blocks 16c as the intermediate blocks.

The central blocks 16a are the blocks corresponding to the inner blocks 16p of the first and second embodiments, and the intermediate blocks 16b and the shoulder blocks 16c are the outer blocks 16q of the first and second embodiments divided into these two groups of blocks.

Provided on the contact patch side, which is the surfaces of the blocks 16a to 16c, are pluralities of sipes 17a to 17c, respectively. Hereinbelow, the sipes 17a disposed in the central blocks 16a are referred to as the central sipes, the sipes 17b disposed in the intermediate blocks 16b as the intermediate sipes, and the sipes 17c disposed in the shoulder blocks 16c as the shoulder sipes.

It is to be noted that, in FIG. 1/8, the reference numeral 18 represents the raised groove bottom portions provided on the bottom of the lug grooves on the center side of the central blocks 16a, and the reference numeral 19 represents the chamfered portions provided on the trailing side of the central blocks 16a and the intermediate blocks 16b.

In the present embodiment, a tread pattern as shown in FIG. 8 is employed to secure the wet braking performance and wear resistance performance and improve the acceleration performance, braking performance and steering stability performance on snowy roads by use of higher μ on the snow.

More specifically, the central circumferential groove 12 is disposed in the center of the central region, and the intermediate circumferential grooves 13 are disposed in the central region and axially outside of the central circumferential groove 12. This increases lateral grip on the snow by virtue of raised edge effect of the block edges of the central blocks 16a and the intermediate blocks 16b. Also, the central circumferential groove 12 so designed as to be circumferentially continuous around the tire enhances the drainage performance of the tire in the circumferential direction and also secures the wet braking performance.

In this arrangement, the groove width of the intermediate circumferential grooves 13 made wider than that of the central circumferential groove 12 can further enhance the drainage effect in the circumferential direction. The position of the intermediate circumferential grooves 13 is preferably within a range of 15% or more and 50% or less of the contact patch width and more preferably within a range of 25% or more and 40% or less thereof. If the position of the intermediate circumferential grooves 13 is too close to the contact center, the block width in the central region will become small, causing a drop in block rigidity. As a result, the wet braking performance and the wear resistance performance will decline. On the other hand, if it is too far from the contact center, the grip on the snow and the wet drainage effect will decline.

Thus, if the groove width of the central circumferential groove 12 is made narrower and the groove width of the intermediate circumferential grooves 13 is made wider, then the drainage performance in the circumferential direction can be enhanced without drops in the block rigidity in the central region.

Also, in the present embodiment, the groove width of the lug grooves 15 is so formed as to be gradually wider from the central region toward the shoulder region. This ensures the block rigidity in the central region by use of a longer block length for the central blocks 16a. As a result, it is possible to prevent the collapse of the blocks in the central region. Accordingly, the wet braking performance on paved roads can not only be enhanced, but also the wear resistance performance can be ensured. In the shoulder region, on the other hand, the wider groove width of the lug grooves 15 secures the fore-aft grip rigidity on the snow by increasing the snow column shear force of the lug grooves 15 which is insufficient in the central region. This improves the acceleration performance on the snow. Also, the groove width of the lug grooves 15, which is gradually wider from the central region to the shoulder region, ensures the wet braking performance by raising the effect of drainage toward the shoulder side.

It is to be noted that the lug groove width ratio, which is the ratio of the groove width of the lug grooves 15 in the shoulder region to the groove width thereof in the central region, is preferably 105% to 500%. When the lug groove width ratio is less than 105%, the effect of changing groove width cannot be gained because of the small difference in groove width. Also, when the lug groove width ratio is over 500%, the block rigidity in the shoulder region drops markedly because of too large lug groove width in the shoulder region. As a result, the wet braking performance on paved roads declines.

Figure 9:
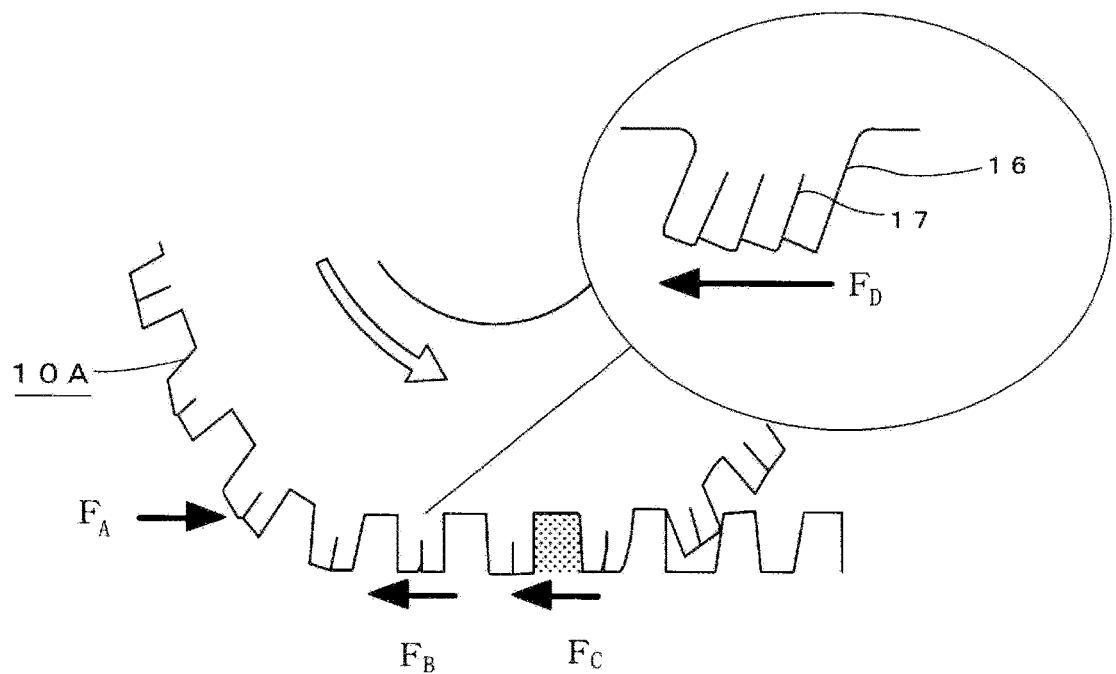
FIG. 9 is illustrations for explaining a mechanism of friction on the snow.

As shown in FIG. 9, the μ on the snow, which is the friction coefficient between the tire 10A and the road surface when the vehicle is running on a snowy road surface, is determined mainly by the compression resistance $F_A$ as the running resistance acting on the front of the tire 10, the surface frictional force $F_B$ acting on the surfaces of the blocks 16, the snow column shear force $F_C$ acting on the grooves (lug grooves 15 here), and the scratching force $F_D$ (edge effect) exerted by the sipe edges and block edges. In this embodiment, three circumferential grooves 12, 13a, 13b are disposed near the center of the contact patch, and at the same time the groove width of the lug grooves 15 in the shoulder regions is made larger than the groove width in the central region. As a result, the fore-aft grip on the snow can be secured by the wider shoulder grooves 15 which ensure the snow column shear force. At the same time, the three circumferential grooves 12, 13a, 13b in the central region provide edge effects by the block edges, thereby ensuring the lateral grip on the snow.

In this case, the three circumferential grooves 12, 13a, 13b are narrow groves. Hence, the ratio of the lug grooves 15 can be made larger in comparison with the conventional pattern design of the same negative rate, which ensures the fore-aft force on the snow effectively.

Also, the three circumferential grooves 12, 13a, 13b located closer to the center of the contact patch will provide the effect of the circumferential grooves when the ground contact shape is small under a light load.

With ordinary FF (front engine front drive) vehicles, the rear load is smaller than the front load. Also, improved lateral grip is known to enhance the stability factor, thereby improving the front-rear balance of the vehicle. The location of the circumferential grooves closer to the axial center in the contact patch as in the present embodiment can concentrate the circumferential grooves in the middle of the contact patch. Hence, the lateral grip when the contact patch shape is small and the load is heavier in the rear will be improved, thus enhancing the stability factor on the snow. Accordingly, improvements will be made in not only the lateral grip but also the F-R balance on the snow, which will enhance overall steering stability performance on the snow.

That is, the shoulder grooves 14, which are circumferential grooves disposed in the shoulder regions, are preferably located within the contact patch width whether the tire is fitted in the front or the rear of a vehicle. And they are more preferably located in positions of 30% or more and 80% or less of the maximum contact patch width under the measurement conditions specified by JATMA for the applicable tire size (Fit the tire on an applicable rim. Apply an internal pressure of 180 kPa if the tire is for a passenger vehicle. Leave the tire standing at room temperature (15 to 30° C.) for 24 hours. Then adjust the internal pressure to the original pressure again before making the measurements. For the measurements of the contact patch shape, make the measurements under the conditions of static load radius measurements, that is, under the load of a mass equal to 88% of the maximum load capacity of the tire).

If the shoulder grooves 14 are disposed in any position in excess of 80% of the maximum contact patch width, the above-mentioned improvement in lateral grip on the snow cannot be achieved. Also, if they are disposed within 30% of the maximum contact patch width, then the block width of the intermediate blocks 16b will be too small, thus causing a drop in block rigidity. As a result, there will be drops in the wet braking performance and wear resistance performance on paved roads. Therefore, the configuration of the central circumferential groove 12 and the intermediate circumferential grooves 13 disposed in the central region and the shoulder grooves 14 disposed in the shoulder region as in the present embodiment can realize the above-mentioned steering stability performance on the snow whether they are formed on the front tire or rear tire with varying contact patch width.

Also, it is of primary importance that the sum of the cross-sectional areas of the central circumferential groove 12 and the intermediate circumferential grooves 13, which are both circumferential grooves, is smaller than the total cross-sectional area of the lug grooves 15, which are lateral grooves. This can make the ratio of the lug grooves 15 larger in comparison with the tire having the conventional tread pattern of the same negative rate (groove area ratio). That is, the area of the lug grooves 15 can be made larger without raising the negative rate (groove area ratio). Accordingly, the snow column shear force by the lug grooves 15 can be increased effectively, and at the same time the fore-aft grip on the snow can be increased effectively. Therefore, the acceleration performance on the snow and the braking performance on the snow can both be improved.

Also, in the present embodiment, the lug grooves 15 are each provided with a raised groove bottom portion 18, which is 10% or more and 90% or less of the sectional area (maximum depth×width of lug groove (central blocks)), on the groove bottom on the center side (central circumferential groove 12 side) of the central blocks 16a.

Provision of the raised groove bottom portion 18 further increases the rigidity of the central blocks 16a. This may prevent the collapse of the blocks and further improve the wet grip. Hence, it is possible to further improve the wet braking performance and wear resistance performance on paved roads.

Figure 10:
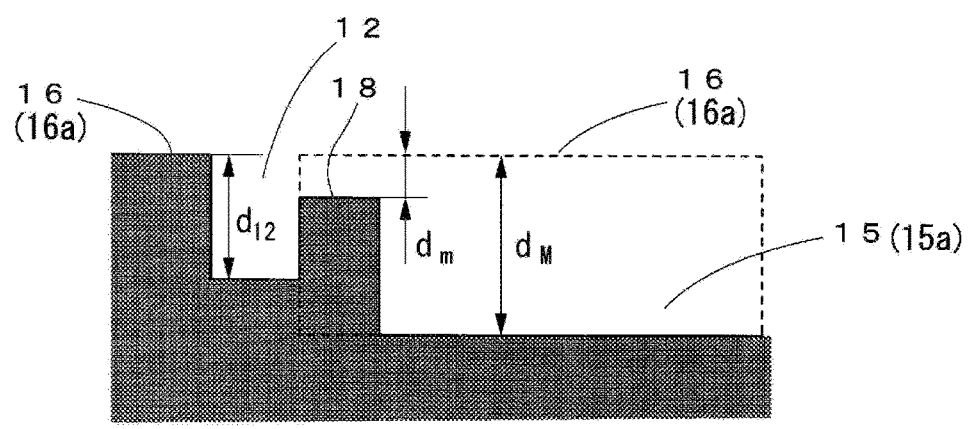
FIG. 10 is a diagram for explaining a relationship between a raised bottom portion, a central circumferential groove, and a lug groove.

The sectional area of the raised groove bottom portion 18, if it is less than 10% of the sectional area of the lug grooves 15, cannot adequately achieve the effect of rigidity increase. Also, the sectional area of the raised groove bottom portion 18, which is in excess of 90% of the sectional area of the lug grooves 15, may lead to the loss of groove function by the lug grooves in the central region. This will not provide sufficient snow column shear force, resulting in a marked drop in fore-aft grip on the snow. As shown in FIG. 10, when the raised groove bottom portion 18 is provided, it is preferable that the groove depth $d_{12}$ of the central circumferential groove 12 is deeper than the minimum depth $d_m$ of the raised groove bottom portion 18 and less than the maximum depth $d_M$ of the lug groove 15. In this manner, the central circumferential groove 12 will be a single continuous groove, thereby enhancing the drainage performance.

Also, to enhance the drainage performance, it is desirable that the groove depth $d_{12}$ of the central circumferential groove 12 be equal to the maximum depth $d_M$ of the lug groove 15. However, to raise the wet grip by increasing the rigidity of the central blocks 16a, it is desirable that the groove depth $d_{12}$ be set shallower than the maximum depth $d_M$ of the lug groove 15. That is, it is preferable that the groove depth $d_{12}$ of the central circumferential groove 12 is 60 to 100% of the maximum depth $d_M$ of the lug groove 15.

As described above, a raised groove bottom portion 18, which is 10% or more and 90% or less of the sectional area of the lug groove 15, is provided. At the same time, the groove depth of the central circumferential groove 12 is deeper than the minimum depth of the raised groove bottom portion 18 and shallower than the maximum depth of the lug groove 15. Accordingly, the wet grip can be increased by virtue of the increased rigidity of the central blocks 16a. Also, the central circumferential groove 12 formed as a single continuous groove helps enhance the drainage performance.

Also, in the present embodiment, the cross-sectional area of the three circumferential grooves (central circumferential groove 12 and intermediate circumferential grooves 13) disposed in the central region is so set that the main groove drainage rate at 50% of the contact width is 0.9 or more and 2.7 or less. The main groove drainage rate at 50% of the contact width meant here is the cross-sectional area of the three grooves continuous circumferentially divided by 50% of the contact width, which is an indicator of the performance of drainage by the circumferential grooves of water on a wet road surface.

When the main groove drainage rate is less than 0.9, the drainage effect cannot be achieved adequately, thus resulting in a drop in wet braking performance. On the other hand, when the main groove drainage rate is in excess of 2.7, the block rigidity declines, causing drops in both wet braking and wear resistance performance. Hence, if the tires are to make steady contact with the road surface when they are running on a wet road surface, it is preferable that the main groove drainage rate at 50% of the contact width is 0.9 or more and 2.7 or less as in this embodiment.

Figure 11:
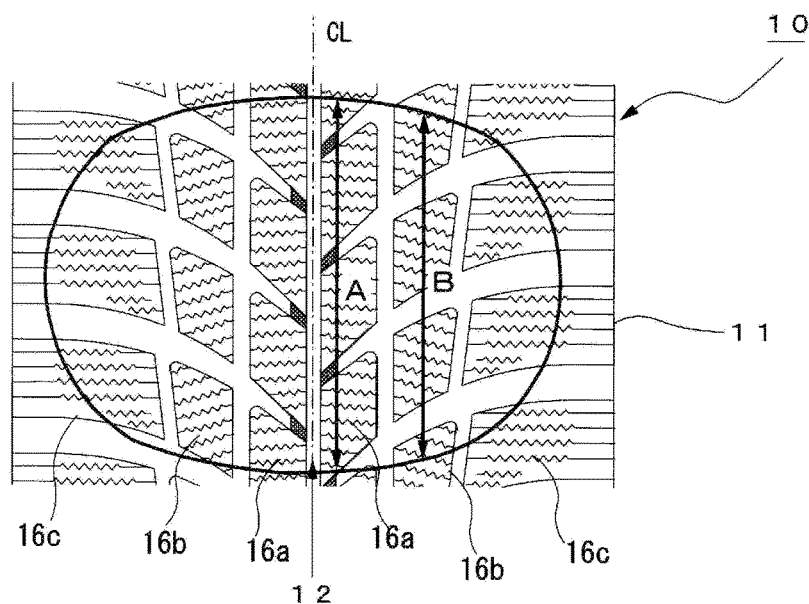
FIG. 11 is diagrams for explaining relationships between the average contact lengths of blocks and drainage performance.

Also, in the present embodiment, as shown in FIG. 11, the ground contact shape, of which the average contact length A, which is the average contact length of the central blocks 16a, and the average contact length B, which is the average contact length of the intermediate blocks 16b, has a relationship of "0.9·A<B<1.1·A".

This makes it possible to drain water entering into the central region effectively. Thus a pneumatic tire having a high wet braking performance while retaining an excellent wear resistance performance can be obtained. When the average contact length B is 90% or less of the average contact length A, the radius difference of the tire becomes large in the central region, causing a marked drop in the wear resistance performance. On the other hand, when the average contact length B is 110% or more of the average contact length A, the draining effect at the contact patch drops enormously. Hence, even when a plurality of circumferentially continuous circumferential grooves are disposed in the central region, the wet braking performance cannot be secured.

Therefore, the wet performance can be secured at a minimum negative setting if a ground contact shape, of which the average contact length A and the average contact length B are in a relationship of "0.9·A<B<1.1·A", can be provided. "0.9·A<B<1.1·A".

Also, it is preferable that the groove depth of the intermediate circumferential grooves 13 is deeper than the groove depth of the shoulder grooves 14. And it is more preferable that the groove depths are in a relationship of "lug grooves 15>intermediate circumferential grooves 13>shoulder grooves 14". As a result, it is possible to secure the acceleration performance on the snow by the lug grooves 15 with the deepest groove depth and also to secure a maximum lateral grip under rear load by the central circumferential groove 12 and the intermediate circumferential grooves 13. Therefore, the lateral edge effect in the central region can be further augmented when the contact patch shape is small and the vehicle is under a rear load. Accordingly, the stability factor on the snow can be strengthened, which leads to improvements in both the lateral grip on the snow and the front-rear balance on the snow.

Also, the groove depths are preferably such that the intermediate circumferential grooves 13 are 60 to 100% and the shoulder grooves 14 30 to 90% with respect to 100% of the lug grooves 15. The circumferential grooves 13 and 14 being shallower than 30% may not cause deformation of block edges in the lateral direction on the snow. This can no longer ensure the edge effect of the circumferential grooves 13 and 14, leading to a drop in the steering stability performance on the snow.

Also, the groove width of the intermediate circumferential grooves 13 and the shoulder grooves 14, which are narrow grooves, is preferably 30 to 80% of the groove depth of the lug grooves 15. If the groove width is less than 30%, then the groove walls of the narrow grooves may come in contact with each other when lateral forces work, and this will interfere with the lateral deformation of block edges on the snow. As a result, it will be difficult to ensure not only the edge effect of the circumferential grooves but also the wet drainage performance. On the other hand, if the groove width is more than 80%, the contact patch area will be smaller, which cannot provide sufficient frictional forces on the snowy and wet road surfaces.

Also, in the present embodiment, in order to further improve the wet braking performance and wear resistance performance, the groove wall angle on the trailing (disengaging) side of the central blocks 16a of the lug grooves 15 is set smaller than the average of the groove wall angle on the trailing side of the intermediate blocks 16b and the groove wall angle on the trailing side of the shoulder blocks 16c.

The groove wall angles provided to the lug grooves on the trailing side of the blocks are effective in raising the block rigidity in the circumferential direction of the tire. This will prevent any unnecessary deformation of the blocks, thus improving the wet grip and wear resistance performance in particular.

The groove wall angles are provided only on the trailing side of the blocks because the deformation when the blocks disengage from the contact patch is greater on the trailing side. If the groove wall angles are provided on the leading (engaging) side also, then sufficient inner volume of the lug grooves will not be secured, which will result in a marked drop in the fore-aft grip on the snow. Therefore, in order to strengthen the blocks, it is the most effective to provide the groove wall angles only on the trailing side of the blocks as in the present embodiment.

The average value of the groove wall angle of the intermediate blocks 16b and the groove wall angle of the shoulder blocks 16c is preferably 5 to 25°. If the value of the groove wall angles is smaller than 5°, the effect of strengthening the block rigidity will not be achieved almost at all. On the other hand, if it is a value greater than 25°, then a sufficient inner volume will not be secured for the lug grooves 15, which will cause a marked drop in the fore-aft grip on the snow.

Thus, the groove wall angle of the lug grooves 15 defining the central blocks 16a is made smaller than the average value of the groove wall angle of the lug grooves 15 defining the intermediate blocks 16b and the groove wall angle of the lug grooves 15 defining the shoulder blocks 16c. This can further increase the block rigidity in the circumferential direction of the tire, thereby further improving the wet grip and wear resistance performance.

Also, in the present embodiment, an R (having a curvature radius) chamfer 19 (circled portions in FIG. 8) is provided on each of the corner portions on the axially outer trailing side of the central blocks 16a and the intermediate blocks 16b. The range of curvature radius (R) is preferably 0.5 mm≤R≤5 mm. Note that the chamfer 19 may also be provided on each of the corner portions on the axially inner trailing side of the blocks.

The corners of the blocks are where the waters flowing through the lug grooves 15 and the intermediate circumferential grooves 13 as well as through the lug grooves 15 and the shoulder grooves 13 converge on each other. Hence, rounding of the corner portions of the blocks provides a rectifying effect on the flows, thus enhancing the wet grip.

The minimum value of the radius of the corner portions is set at 0.5 mm because the radius smaller than that cannot provide the rectification effect. And the maximum value thereof is set at 5 mm because the radius larger than that will make the blocks smaller, causing drops in block rigidity and wet grip.

Now a description is given of the sipes 17a to 17c provided on the ground contact side of the blocks 16a to 16c. Here, let us call the sipe angle (angle between the extension direction of the sipes and the circumferential direction of the tire) of the central sipes 17a formed in the central blocks 16a the central sipe angle, the sipe angle of the intermediate sipes 17b formed in the intermediate blocks 16b the intermediate sipe angle, and the sipe angle of the shoulder sipes 17c formed in the shoulder blocks 16c the shoulder sipe angle. In the present embodiment, as shown in FIG. 8, the respective sipe angles are so set that the central sipe angle is smaller than the shoulder sipe angle and the intermediate sipe angle is smaller than the central sipe angle.

In other words, in the shoulder blocks 16c, the shoulder sipes 17c are oriented the closest to the axial direction of the tire. At the time of braking, the load on the front tires increases, and so the contact area of the shoulder blocks 16 increases. As a result, the sipe edge effect increases, thereby improving the braking performance on the snow.

On the other hand, in the central blocks 16 located closest to the center of contact, the central sipes 17a are oriented the next closest to the axial direction after the shoulder blocks 16c. As a result, the sipe edge effect increases, thereby improving the acceleration performance on the snow.

Also, in the intermediate blocks 16b, the intermediate sipes 17b are oriented the closest to the circumferential direction of the tire. Therefore, at the time of cornering, the sipe edge effect increases, thereby improving the steering stability performance on the snow.

In this manner, the central sipe angle and the intermediate sipe angle are made smaller to increase the lateral edge components, and the shoulder sipe angle is made larger to secure the fore-aft edge components. This will improve not only the acceleration performance on the snow but also the steering stability performance on the snow.

It is to be noted that the intermediate sipe angle is preferably 45° or more and 80° or less and the shoulder sipe angle is 90° (parallel to the axial direction of the tire).

As a result, further improvement can be made on the acceleration performance on the snow and the steering stability performance on the snow.

It should be noted that the blocks provided with sipes show better grip on the snow but reduced block rigidity. Hence, there will be drops in wet grip and wear resistance performance. To prevent the drop in block rigidity, it is conceivable to provide a raised bottom reinforcement on both ends of each sipe. However, the raised bottoms, if provided at both ends of each sipe, may not allow the sipes to open when the block comes in contact with the road surface, resulting in reduced edge effect.

Figure 12A:
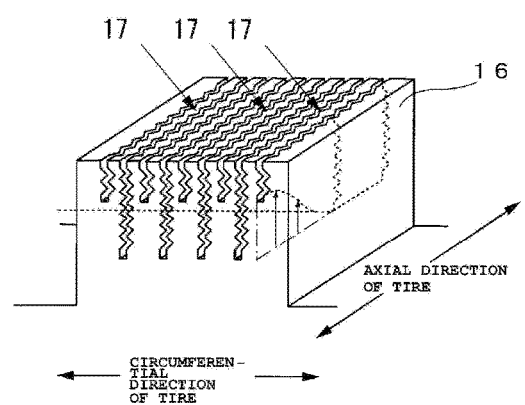
FIGS. 12A and 12B are illustrations showing 3D examples of sipes.
Figure 12B:
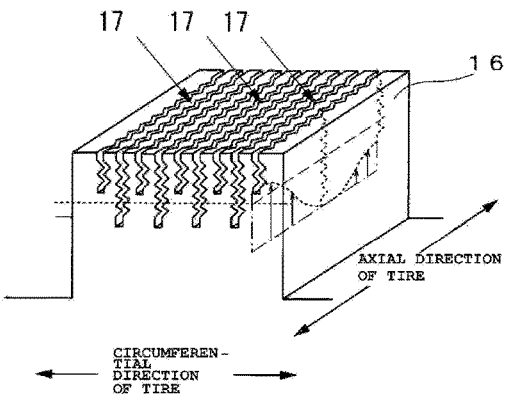

Thus, in the present embodiment, as an exemplary solution to the above-mentioned conflict between edge effect and block rigidity, a raised bottom reinforcement is given to one end only of each sipe as shown in FIG. 12A, or a raised bottom reinforcement is given to both ends of each sipe as shown in FIG. 12B.

Where the raised bottom reinforcements are provided on both ends of the sipes, the reinforcement heights (raised bottom heights) are to be so set as to be different from each other. In the present embodiment, the higher of the raised bottoms is 50% or more of the maximum depth of the sipes and the lower of the raised bottoms is less than 50% thereof.

Figure 13:
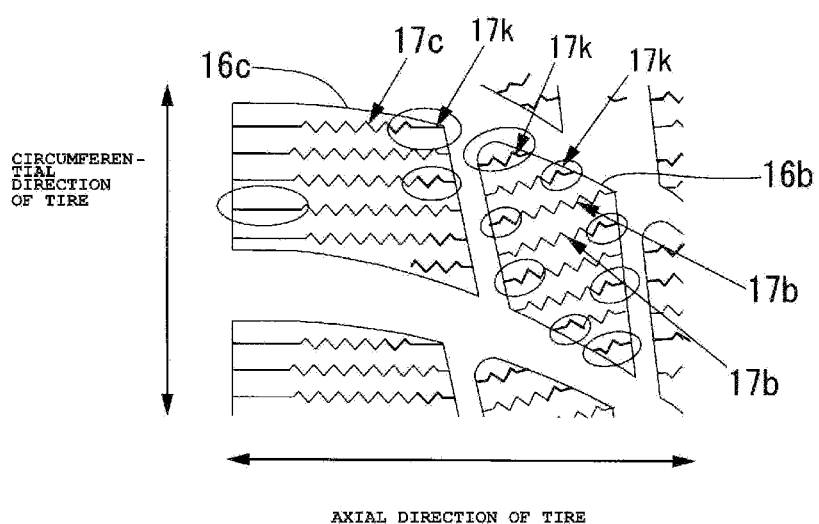
FIG. 13 is an illustration showing an example of sipe arrangement.

Also, as shown in FIG. 13, the arrangement is such that the height setting for the raised bottom reinforcements (raised bottom portions 17k) is not repeated at least three times or more in the circumferential direction for the neighboring sipes and that the setting is for 50% or more of the total number of sipes within a block. It is to be noted that for the sipes located in positions with narrow land width, such as block end portions, a raised bottom may be provided over the entirety of the sipes to increase block rigidity.

In this manner, providing a strong reinforcement on one of the sipe ends will raise the block rigidity and have the edge effect raised on the weaker side of reinforcement. As a result, the block rigidity and the wet grip and wear resistance performance can not only be improved, but also the edge effect and grip on the snow can be secured.

Note that the higher of the raised bottoms is 50% or more of the maximum depth of the sipes because the height of less than 50% does not provide sufficient block reinforcement effect. And the lower of the raised bottoms is 50% or less of the maximum depth of the sipes because the height of over 50% does not provide sufficient edge effect.

The higher of the raised bottoms is preferably 50 to 100% and more preferably 60 to 90% of the maximum depth of the sipes. On the other hand, the lower of the raised bottoms is preferably 0 to 50% and more preferably 0 to 30% of the maximum depth of the sipes.

Also, the height setting for the raised bottoms is not repeated at least three times or more in the circumferential direction for the neighboring sipes. This is because the repetition of the same setting may create a locality in the block end having an extremely high/low rigidity. This will result in a failure to achieve the effect of the raised bottoms due to the imbalance between block reinforcement effect and edge effect. Note that it is more preferable if the same setting is not repeated two times or more.

Also, the setting of raised bottoms for both ends of the sipes is for 50% or more of the total number of sipes within a block. This is because there are cases where normally quite shallow 2D sipes are provided, for instance, in portions with narrow block width, such as block corners, or in the central region of a block to ensure block rigidity. A sufficient rigidity effect can be achieved if the raised bottom reinforcement is provided for 50% or more of the number of sipes within a block, and more preferably 70% or more of them.

Also, the sipes 17a to 17c, which are 3D sipes as shown in FIGS. 12A and 12B in the present embodiment, may be 2D sipes. Also, the sipes may be linear, wavy, or polygonal-line shaped.

The blocks provided with 3D sipes show greater block rigidity effect in both the circumferential and axial directions of the tire than the blocks with 2D sipe walls. That is, provision of 3D sipes with undulation in the depth direction in blocks can ensure high block rigidity. And by preventing unnecessary block deformation, the wet grip and wear resistance performance in particular can be improved.

The 3D sipes may be disposed more effectively in the shoulder blocks 16c which are subject to greater block deformation. Also, it is preferable to dispose 3D sipes in the intermediate blocks 16b also and more preferable to dispose them in the central blocks 16a also. The effect of disposing 3D sipes in the intermediate blocks 16b/the central blocks 16a falls short of the effect of disposing them in the shoulder blocks 16c, but provides the effect of raising the block rigidity as a whole.

By definition herein, a block having one pair or more of 3D sipes therein will be referred to as a block provided with 3D sipes.

It is to be noted that in the foregoing third embodiment, a description has been given of a tire 10A which has the groove width of the intermediate circumferential grooves 13 wider than the width of the central circumferential groove 12. However, similar effects can be achieved with a tire 10B which has the groove width of the intermediate circumferential grooves 13 narrower than the width of the central circumferential groove 12 as shown in FIG. 14.

Figure 14:
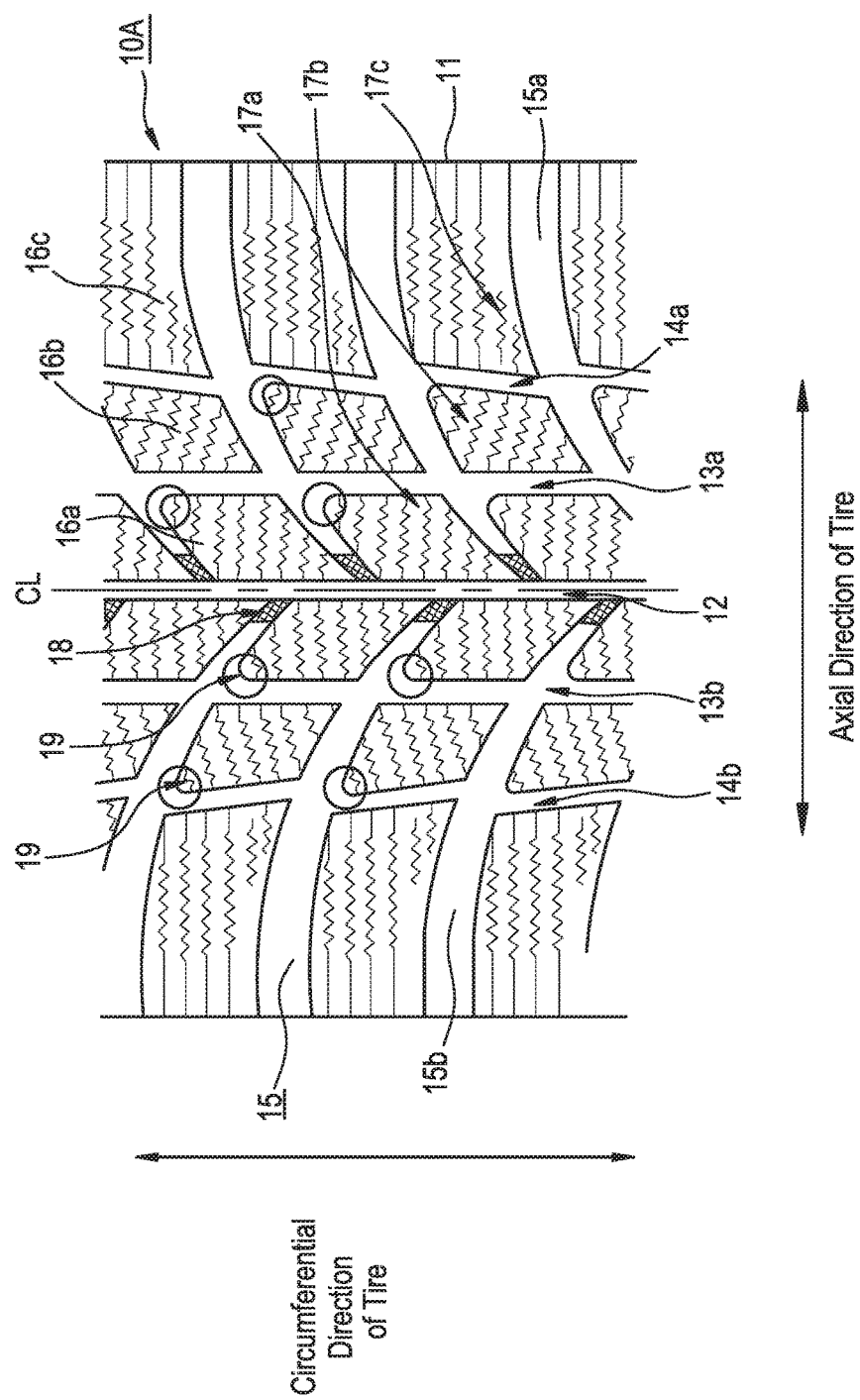
FIG. 14 is an illustration showing another example of a tread pattern of a tire according to the present invention.

In the example of FIG. 14, different from the third embodiment, the drainage effect in the circumferential direction is mainly provided by the central circumferential groove 12 disposed in the center of the contact patch, and the drainage effect is further enhanced by the intermediate circumferential grooves 13a, 13b. In this case, too, it is preferable that the central circumferential groove 12 and the intermediate circumferential grooves 13 are so formed that the sum of the cross-sectional areas of the central circumferential groove 12 and the intermediate circumferential grooves 13 is smaller than the total cross-sectional area of the lug grooves 15, which are lateral grooves, and that the main groove drainage rate at 50% of contact width is 1.0 or more and 2.5 or less.

Examples (3)

A detailed description is given hereinbelow of the examples of the present invention:

The rim and the internal pressure were selected in compliance with the applicable rim corresponding to the size of radial ply tire and the air pressure—load capacity correspondence table as defined by JATMA YEAR BOOK (2011 Standard of Japan Automobile Tire Manufacturers Association).

The size of the trial model tire was 195/65R15. The groove depth of the lug grooves was 9 mm, and the sipe depth was all 6 mm.

Figure 15:
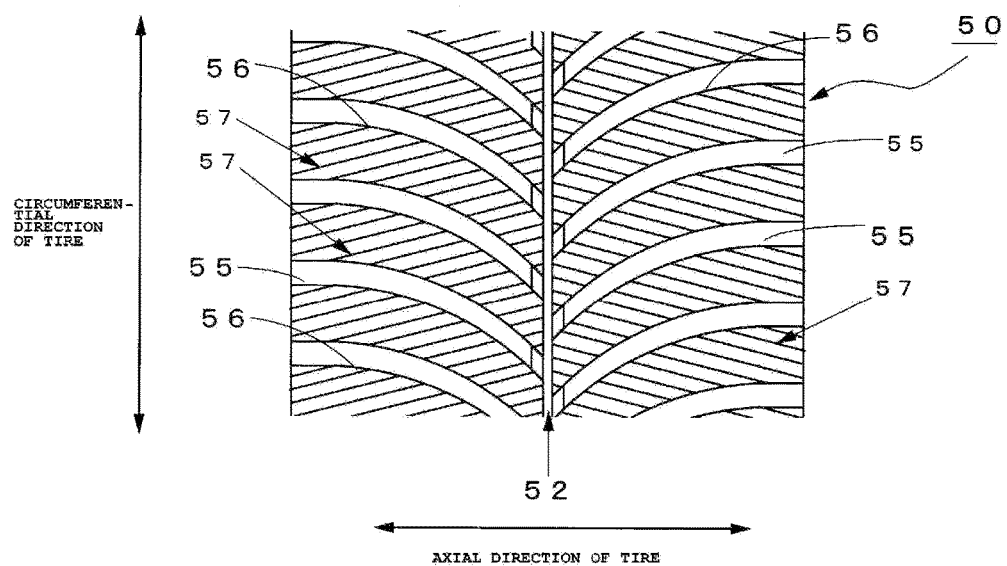
FIG. 15 is an illustration showing a tread pattern of a conventional pneumatic tire.

As shown in FIG. 15, the tread pattern of Conventional Example has only the central circumferential groove 52 and the lug grooves 55 whose groove width is even in both the central region and shoulder region. And the pattern has no intermediate circumferential grooves and shoulder grooves, and the angle of the sipes 57 provided in the land portions 56 is all 15°. Note also that the lug groove width of Conventional Example is 10 mm, and the negative rate is 32%.

The tread pattern of Examples 201 to 262 and Examples 301 to 362 is such that it has three circumferential grooves (central circumferential groove and right and left intermediate circumferential grooves) continuous circumferentially in the central region and that the lug groove width in the shoulder region is greater than the lug groove width in the central region. Also, it has one each of narrower circumferential grooves (shoulder groves) running discontinuously approximately in the circumferential direction on the right and left side closer to the shoulder region from the central region, and the shoulder grooves are located within the contact patch. And the relationship between the negative rate of the lug grooves and the negative rate of the circumferential grooves is "lug groove negative≥circumferential groove negative".

The pattern shape of Examples 201 to 262 is all such that, as shown in FIG. 8, the groove width of the right and left intermediate circumferential grooves is formed wider than the groove width of the central circumferential groove. On the other hand, the pattern shape of Examples 301 to 362 is all such that, as shown in FIG. 14, the groove width of the right and left intermediate circumferential grooves is formed narrower than the groove width of the central circumferential groove. Note that the pattern shapes of the respective Examples will be discussed later.

Also, in the present embodiment, there are eight sipes disposed in each of the central blocks and the intermediate blocks, and the first and the eighth of them in the circumferential direction of the block are reinforced with a sipe depth of 1 mm in order to secure the block rigidity. Accordingly, it is the intermediate six sipes that may be subject to any change in sipe settings. In the shoulder blocks, which have no shallower sipes for reinforcement, all the six sipes may be subject to changes.

In the testing, the above-mentioned tire was fitted to a 6J-15 rim at an internal pressure of 200 kPa, and the wheels were fitted on a passenger vehicle before they were subjected to acceleration performance tests and steering stability performance tests on the snow and wet braking performance tests and wear resistance performance tests on the paved road. In the acceleration performance tests on the snow, the evaluation was made by measuring the time to reach a 50 m point at full acceleration from rest state (acceleration time). In the steering stability performance tests on the snow, the evaluation was made by measuring the lap time when the test vehicle was driven by an evaluation driver over a course for evaluation of steering stability performance on the snow. In the wet braking performance tests, the evaluation was made by spraying water to a depth of 2 mm on the paved road and measuring the braking distance of the vehicle from a speed of 60 km/h to a complete stop. In the wear resistance performance tests, the test vehicle was run 5000 km over a predetermined course of paved road, the wear volumes of tread rubber of various parts from the central region to the shoulder region of the tire were measured, and the evaluation was made by the average values of the wear volumes from the various parts (the smaller the wear volumes are, the better).

The results of the tests are shown in the tables of FIGS. 16 and 17. Note that the test results are represented by index numbers with respect to 100 for the conventional values. The larger the index numbers, the better for any of the above-cited performances.

The particulars of the pattern shapes of Examples 201 to 262 are as follows:

Example 201

Negative Rate (%)
Total negative rate//circumferential groove negative rate//lug groove negative rate=32//13//19
Average Lug Groove Width (mm)
Central region lug groove width/shoulder region lug groove width=6.15/5.85(105)
The value in parentheses is the shoulder region lug groove width (%) with respect to 100 of the central region lug groove width.
Position of intermediate groove=30%
Position of shoulder groove=60%
The position of the shoulder groove is represented by the ratio of the distance of the groove from axial center to ½ of the maximum contact width.
Central raised bottom portion area/central block groove area=30%
Minimum depth of central raised bottom portions=4 mm Circumferential groove depth (mm): Central circumferential groove//intermediate circumferential groove//shoulder:groove=6.5//6.5//6.5
Circumferential groove width (mm): Central circumferential groove//intermediate circumferential groove//shoulder groove=4.5//6.0//4.5
Main groove drainage rate=1.47
Lug groove angle of central blocks=4°
Lug groove angle of intermediate and shoulder blocks=4°
Trailing corner R of central, intermediate, and shoulder blocks=None
Average contact length of blocks (relative to 100 of central blocks)
a//b//c=100//100//100
Sipe angle (°)
Central sipe angle//intermediate sipe angle//shoulder sipe angle=75//75//75
Raised sipe bottom (%)
(Maximum raised bottom/maximum sipe depth)//(minimum raised bottom/maximum sipe depth)=0//0
Maximum number of adjacent sipes with the same raised bottom=6
Number of sipes with raised bottom/total of sipes within a block (%)=0
Presence of 3D sipes
Central blocks//intermediate blocks//shoulder blocks=0//0//0

Example 202 has the same features as Example 201 except that "central region lug groove width/shoulder region lug groove width" is 4/8(200). Example 203 has the same features as Example 201 except that "central region lug groove width/shoulder region lug groove width" is 3/9(300). Example 204 has the same features as Example 201 except that "central region lug groove width/shoulder region lug groove width2 is 2/10(500)". Example 205 has the same features as Example 201 except that "central region lug groove width/shoulder region lug groove width2 is 1.5/10.5 (700)". Note that for comparison, a tire with a tread pattern featuring "central region lug groove width/shoulder region lug groove width" being 6/6(100) (Comparative Example 201) was manufactured and put to the same tests. Example 206 has the same features as Example 203 except that "position of intermediate groove" is 15%. Example 207 has the same features as Example 203 except that "position of intermediate groove" is 25%. Example 208 has the same features as Example 203 except that "position of intermediate groove" is 40%. Example 209 has the same features as Example 203 except that "position of intermediate groove" is 50%. Comparative Example 202 has the same features as Example 203 except that "position of intermediate groove" is 55%. Example 210 has the same features as Example 203 except that "position of shoulder groove" is 35%. Example 211 has the same features as Example 203 except that "position of shoulder groove" is 40%. Example 212 has the same features as Example 203 except that "position of shoulder groove" is 80%. Example 213 has the same features as Example 203 except that "position of shoulder groove" is 85%. Example 214 has the same features as Example 203 except that the central circumferential groove width is 6.0 mm, the intermediate circumferential groove width 7.0 mm, and the shoulder groove width 4.5 mm (negative rate: 32//13//19, main groove drainage rate=1.28) and that "central region lug groove width/shoulder region lug groove width" is 2.7/8 (300).

Note that for comparison, a tire with a tread pattern featuring the central circumferential groove width being 7.5 mm, the intermediate circumferential groove width 8.0 mm, and the shoulder groove width 4.5 mm (negative rate: 32//17//15, main groove drainage rate=2.09) (Comparative Example 203) was manufactured and put to the same tests.

Example 215 has the same features as Example 203 except that "central raised bottom portion area/central block groove area" is 5%. Example 216 has the same features as Example 203 except that "central raised bottom portion area/central block groove area" is 10%. Example 217 has the same features as Example 203 except that "central raised bottom portion area/central block groove area" is 60%. Example 218 has the same features as Example 203 except that "central raised bottom portion area/central block groove area" is 90%. Example 219 has the same features as Example 203 except that "central raised bottom portion area/central block groove area" is 95%. Example 220 has the same features as Example 203 except that "central sipe angle//intermediate sipe angle//shoulder sipe angle" are 85//75//85. Example 221 has the same features as Example 203 except that "central sipe angle//intermediate sipe angle//shoulder sipe angle" are 85//75//90. Example 222 has the same features as Example 203 except that "central circumferential groove width//intermediate circumferential groove width//shoulder groove width" are 3.0//4.5//4.5 and "central circumferential groove depth//intermediate circumferential groove depth//shoulder groove depth" are 5.5//5.5//5.5 (negative rate=28//9//19, main groove drainage rate=0.9). Example 223 has the same features as Example 203 except that "central circumferential groove width//intermediate circumferential groove width//shoulder groove width" are 3.0//5.0//4.5 and "central circumferential groove depth//intermediate circumferential groove depth//shoulder groove depth" are 6.0//6.0//6.0 (negative rate=29//9//19, main groove drainage rate=1.07). Example 224 has the same features as Example 203 except that "central circumferential groove width//intermediate circumferential groove width//shoulder groove width" are 6.0//7.0//4.5 and "central circumferential groove depth//intermediate circumferential groove depth//shoulder groove depth" are 7.0//7.0//7.0 (negative rate=32//13//19, main groove drainage rate=1.92). Example 225 has the same features as Example 203 except that "central circumferential groove width//intermediate circumferential groove width//shoulder groove width" are 6.5//7.5//4.5 and "central circumferential groove depth//intermediate circumferential groove depth//shoulder groove depth" are 8.5//8.5//8.5 (negative rate=35//16//19, main groove drainage rate=2.60). Example 226 has the same features as Example 203 except that "central circumferential groove width//intermediate circumferential groove width//shoulder groove width" are 6.5//7.5//4.5 and "central circumferential groove depth//intermediate circumferential groove depth//shoulder groove depth" are 9.0//9.0//9.0 (negative rate=35//16//19, main groove drainage rate=2.65). Example 227 has the same features as Example 203 except that "average contact lengths of blocks a//b//c" are 100//115//100. Example 228 has the same features as Example 203 except that "average contact lengths of blocks a//b//c" are 100//110//100. Example 229 has the same features as Example 203 except that "average contact lengths of blocks a//b//c" are 100//90//100. Example 230 has the same features as Example 203 except that "average contact lengths of blocks a//b//c" are 100//85//100.

Example 231 has the same features as Example 203 except that "(maximum raised bottom/maximum sipe depth)//(minimum raised bottom/maximum sipe depth)" are 50//50 and that "number of sipes with raised bottom/total of sipes within a block" is 75%. Example 232 has the same features as Example 203 except that "(maximum raised bottom/maximum sipe depth)//(minimum raised bottom/maximum sipe depth)" are 60//40, "maximum number of adjacent sipes with the same raised bottom" is 0, and "number of sipes with raised bottom/total of sipes within a block" is 75%. Example 233 has the same features as Example 203 except that "(maximum raised bottom/maximum sipe depth)//(minimum raised bottom/maximum sipe depth)" are 80//20, "maximum number of adjacent sipes with the same raised bottom" is 0, and "number of sipes with raised bottom/total of sipes within a block" is 75%. Example 234 has the same features as Example 203 except that "(maximum raised bottom/maximum sipe depth)//(minimum raised bottom/maximum sipe depth)" are 100//0, "maximum number of adjacent sipes with the same raised bottom" is 0, and "number of sipes with raised bottom/total of sipes within a block" is 75%. Example 235 has the same features as Example 203 except that "(maximum raised bottom/maximum sipe depth)//(minimum raised bottom/maximum sipe depth)" are 80//0, "maximum number of adjacent sipes with the same raised bottom" is 0, and "number of sipes with raised bottom/total of sipes within a block" is 75%. Example 236 has the same features as Example 203 except that "(maximum raised bottom/maximum sipe depth)//(minimum raised bottom/maximum sipe depth)" are 80//0, "maximum number of adjacent sipes with the same raised bottom" is 2, and "number of sipes with raised bottom/total of sipes within a block" is 75%. Example 237 has the same features as Example 203 except that "(maximum raised bottom/maximum sipe depth)//(minimum raised bottom/maximum sipe depth)" are 80//0, "maximum number of adjacent sipes with the same raised bottom" is 3, and "number of sipes with raised bottom/total of sipes within a block" is 75%. Example 238 has the same features as Example 3 except that "(maximum raised bottom/maximum sipe depth)//(minimum raised bottom/maximum sipe depth)" are 80//0, "maximum number of adjacent sipes with the same raised bottom" is 4, and "number of sipes with raised bottom/total of sipes within a block" is 75%. Example 239 has the same features as Example 203 except that "(maximum raised bottom/maximum sipe depth)//(minimum raised bottom/maximum sipe depth)" are 80//0, "maximum number of adjacent sipes with the same raised bottom" is 0, and "number of sipes with raised bottom/total of sipes within a block" is 62.5%. Example 240 has the same features as Example 203 except that "(maximum raised bottom/maximum sipe depth)//(minimum raised bottom/maximum sipe depth)" are 80//0, "maximum number of adjacent sipes with the same raised bottom" is 0, and "number of sipes with raised bottom/total of sipes within a block" is 50%. Example 241 has the same features as Example 203 except that "(maximum raised bottom/maximum sipe depth)//(minimum raised bottom/maximum sipe depth)" are 80//0, "maximum number of adjacent sipes with the same raised bottom" is 0, and "number of sipes with raised bottom/total of sipes within a block" is 37.5%.

Example 242 has the same features as Example 203 except that "central circumferential groove depth//intermediate circumferential groove depth//shoulder groove depth" are 6.5//9.0//8.1 8 (main groove drainage rate=0.85). Example 243 has the same features as Example 203 except that "central circumferential groove depth//intermediate circumferential groove depth//shoulder groove depth" are 6.5//7.2//5.4 (main groove drainage rate=1.11). Example 244 has the same features as Example 203 except that "central circumferential groove depth//intermediate circumferential groove depth//shoulder groove depth" are 6.5//5.4//2.7 (main groove drainage rate=1.78). Example 245 has the same features as Example 203 except that "central circumferential groove depth//intermediate circumferential groove depth//shoulder groove depth" are 6.5//4.5//1.35 (main groove drainage rate=2.09).

Example 246 has the same features as Example 203 except that "central circumferential groove width//intermediate circumferential groove width//shoulder groove width" are 2.5//3.5//4.5. Example 247 has the same features as Example 203 except that "central circumferential groove width//intermediate circumferential groove width//shoulder groove width" are 3.5//3.5//4.5.

Example 248 has the same features as Example 203 except that "lug groove wall angle of intermediate and shoulder blocks" is 5°. Example 249 has the same features as Example 203 except that "lug groove wall angle of intermediate and shoulder blocks" is 15°. Example 250 has the same features as Example 203 except that "lug groove wall angle of intermediate and shoulder blocks" is 25°. Example 251 has the same features as Example 203 except that "lug groove wall angle of intermediate and shoulder blocks" is 30°. Example 252 has the same features as Example 203 except that "trailing corner R of central, intermediate, and shoulder blocks" is 0.3 mm. Example 253 has the same features as Example 203 except that "trailing corner R of central, intermediate, and shoulder blocks" is 0.5 mm. Example 254 has the same features as Example 203 except that "trailing corner R of central, intermediate, and shoulder blocks" is 2.5 mm. Example 255 has the same features as Example 203 except that "trailing corner R of central, intermediate, and shoulder blocks" is 5 mm. Example 256 has the same features as Example 203 except that "trailing corner R of central, intermediate, and shoulder blocks" is 6 mm.

Example 257 has the same features as Example 203 except that 3D sipes are disposed in the shoulder blocks. Example 258 has the same features as Example 203 except that 3D sipes are disposed in the shoulder blocks and the intermediate blocks. Example 259 has the same features as Example 203 except that 3D sipes are disposed in all blocks. Example 260 has the same features as Example 203 except that the central circumferential groove depth is 3.6 mm. Example 261 has the same features as Example 203 except that the central circumferential groove depth is 5.4 mm. Example 262 has the same features as Example 203 except that the central circumferential groove depth is 9.0 mm.

The particulars of the pattern shapes of Examples 301 to 362 are as follows:

Examples 301 to 313 and Comparative Examples 301 and 302 have the same features as Example 203 except that "central circumferential groove width//intermediate circumferential groove width//shoulder groove width" are 6.5//5.0//4.5. Example 314 has the same features as Example 203 except that "central circumferential groove width//intermediate circumferential groove width//shoulder groove width" are 7//6.5//4.5. Comparative Examples 303 has the same features as Example 203 except that "central circumferential groove width//intermediate circumferential groove width//shoulder groove width" are 8.5//7.5//4.5. Examples 315 to 321 have the same features as Example 203 except that "central circumferential groove width//intermediate circumferential groove width//shoulder groove width" are 6.5//5.0//4.5. Example 322 has the same features as Example 203 except that "central circumferential groove width//intermediate circumferential groove width//shoulder groove width" are 5.0//4.0//4.5. Example 323 has the same features as Example 203 except that "central circumferential groove width//intermediate circumferential groove width//shoulder groove width" are 5.0//4.0//4.5. Example 324 has the same features as Example 203 except that "central circumferential groove width//intermediate circumferential groove width//shoulder groove width" are 8.0//6.0//4.5. Example 325 has the same features as Example 203 except that "central circumferential groove width//intermediate circumferential groove width//shoulder groove width" are 8.5//6.5//4.5. Example 346 has the same features as Example 203 except that "central circumferential groove width//intermediate circumferential groove width//shoulder groove width" are 3.5//3.0//4.5. Example 347 has the same features as Example 203 except that "central circumferential groove width//intermediate circumferential groove width//shoulder groove width" are 4.5//4.0//4.5. Examples 348 to 362 have the same features as Example 203 except that "central circumferential groove width//intermediate circumferential groove width//shoulder groove width" are 6.5//5.0//4.5.

As is evident from the tables of FIGS. 16 and 17, it has been confirmed that the tires of Examples 201 to 205 featuring greater lug groove widths in the central region than the lug groove widths in the shoulder region show improvements in all of acceleration performance on the snow, steering stability performance on the snow, wet braking performance, and wear resistance performance on those of the Conventional Example tire. It is to be noted that the greater the lug groove width in the shoulder region than the lug groove width in the central region, the higher the acceleration performance on the snow, the stability performance on the snow, and the wear resistance performance. And as for the wet braking performance, Example 203 with the lug groove width in the shoulder region being 300% of the lug groove width in the central region shows the highest evaluation. Also, the samples having the same groove width as the lug groove width in the central region shows improved acceleration performance on the snow, but no significant difference in stability performance on the snow, wet braking performance, and wear resistance performance from those of Conventional Example. Therefore, as for the size of the lug groove width in the shoulder region in relation to the lug groove width in the central region, it is considered preferable that the lug groove width in the shoulder region is in a range of 105 to 500% of the lug groove width in the central region.

Also, as evidenced by Example 203, Examples 206 to 209, and Comparative Example 202, it has been confirmed that the position of the intermediate circumferential groove should preferably be within a range of 15% to 50% of the distance from the axial center of the tire to ½ of the maximum contact width. Also, as evidenced by Examples 210 to 213, it has been confirmed that the position of the shoulder groove should preferably be within a range of 35% to 85% of the distance from the axial center of the tire to ½ of the maximum contact width.

Also, as can be understood by comparing Examples 203 and 214 against Comparative Example 203, all of the acceleration performance on the snow, the stability performance on the snow, the wet braking performance, and the wear resistance performance improve on those of Conventional Example when the relationship between the lug groove negative rate and the circumferential groove negative rate is "lug groove negative rate circumferential groove negative rate". However, as with Comparative Example 203, of which the lug groove negative rate is lower than the circumferential groove negative rate, it has been confirmed that there is not much improvement of the above-mentioned performances on those of Conventional Example even when a central circumferential groove and four narrower circumferential grooves are provided and the lug groove width in the shoulder region is made greater than the lug groove width in the central region.

Also, as with Examples 215 to 220, which are each provided with a central raised bottom portion, it has been confirmed that the acceleration performance and stability performance on the snow or the wet braking performance and wear resistance performance show improvements.

Also, as can be understood by comparing Example 203 against Examples 221 and 222, it has been confirmed that the acceleration performance on the snow and the steering stability performance on the snow show further improvements when the measures of the sipe angle are so set as "shoulder sipe angle<central sipe angle<intermediate sipe angle".

Also, as evidenced by Example 203 and Examples 222 to 226, it has been confirmed that the wet braking performance and wear resistance performance show improvements when the main groove drainage rate is set at 0.9 to 2.7.

Also, as evidenced by Example 203 and Examples 227 to 230, it has been confirmed that the wet braking performance shows further improvement when the average contact length b of intermediate blocks is set greater than the average contact length c of shoulder blocks.

Also, as evidenced by Examples 231 to 241, it has been confirmed that the wet braking performance and wear resistance performance show further improvements when the sipes are provided with a raised bottom portion at both ends thereof.

Also, as evidenced by Examples 242 to 245, it has been confirmed that the steering stability performance on the snow can be secured if the depth of the intermediate circumferential grooves is set deeper than the depth of the shoulder grooves.

Also, as evidenced by Examples 248 to 251, it has been confirmed that the wet braking performance and wear resistance performance show further improvements if angles are given to the groove walls of the lug grooves in the intermediate blocks and the shoulder blocks. And, as evidenced by Examples 252 to 256, it has been confirmed that the wet braking performance shows improvement if a chamfering R is given to the trailing corners of the central, intermediate, and shoulder blocks.

Also, as evidenced by Examples 257 to 259, it has been confirmed that the wet braking performance and wear resistance performance show further improvements if 3D sipes are disposed in the blocks.

It is to be noted that, as evidenced by Examples 203 and 260 to 262, the groove depth of the central circumferential groove should be 40 to 100% of the depth of the lug grooves.

Also, as can be seen in the tables of FIGS. 18 and 19, the results of tests of Examples 301 to 362 have been identical to those of Examples 201 to 262.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

DESCRIPTION OF REFERENCE NUMERALS

10 pneumatic tire
11 tread 12 central circumferential groove
13, 13a, 13b inner circumferential grooves
14, 14a, 14b outer circumferential grooves
15 lug groove
15a right-side lug groove
15b left-side lug groove
16p, 16q blocks
16a central block
16b intermediate block
16c shoulder block
17p, 17q sipe
17a central sipe
17b intermediate sipe
17c shoulder sipe
18 raised bottom portion
19 chamfer

The invention claimed is:

1. A pneumatic tire comprising a tread, the tread having, in a surface thereof:

lug grooves on one side extending from one axial edge towards an axial center of the tire in such a manner as to intersect with a circumferential direction thereof and lug grooves on the other side extending in a symmetrically opposite direction from the axial center towards the other axial edge of the tire, such that the lug grooves on one side and the lug grooves on the other side form a directional tread pattern;

three circumferential grooves disposed in a central region and extending circumferentially around the tire including a central circumferential groove and two intermediate circumferential grooves each disposed on a different side of the central circumferential groove, and one each of shoulder grooves extending circumferentially around the tire in shoulder regions of the tire;

wherein axial length (L) of the central region and total (S) of a groove sectional area of the three circumferential grooves disposed in the central region satisfy a relationship of "1 mm≤(S/L)≤3 mm", the central region being a region enclosed by two straight parallel lines each passing through a ground-contacting center running along the axial direction of the tire between contact width center, being defined as a center of a ground contacting area in the axial direction of the tire, and a respective contact edge, being defined as an edge of the ground-contacting area in the axial direction of the tire, with shoulder regions being regions outside of the straight lines, wherein the shoulder grooves are grooves disposed discontinuously in a circumferential direction within a contact patch of the tire, wherein an average groove width of the lug grooves defining shoulder blocks is greater than an average groove width of the lug grooves defining central blocks, wherein a groove width of each of the intermediate circumferential grooves is wider than a groove width of the central circumferential groove, wherein a sum of the cross-sectional areas of the central circumferential groove, the intermediate circumferential grooves, and the shoulder grooves is smaller than a cross-sectional area of the lug grooves, and wherein a groove bottom of each of the lug grooves on the axial center side in the central blocks has a raised groove bottom portion having a cross-sectional area of 10% or more and 90% or less of the cross-sectional area of the respective lug groove, a groove depth of the central circumferential groove is deeper than a minimum depth of each of the raised groove bottom portions and less than a maximum depth of each of the lug grooves, the central circumferential groove being a circumferential groove located in an axial center of the tire of the circumferential grooves disposed in the central region, the intermediate circumferential grooves being circumferential grooves located in axially outer positions, and the shoulder grooves being circumferential grooves disposed in the shoulder regions, and the central blocks being blocks defined by the central circumferential groove, the intermediate circumferential grooves, and the lug grooves, the shoulder blocks being blocks defined by the shoulder grooves and the lug grooves, and the intermediate blocks being blocks defined by the intermediate circumferential grooves, the shoulder grooves, and the lug grooves.

2. A pneumatic tire comprising a tread, the tread having, in a surface thereof:

lug grooves on one side extending from one axial edge towards an axial center of the tire in such a manner as to intersect with a circumferential direction thereof and lug grooves on the other side extending in a symmetrically opposite direction from the axial center towards the other axial edge of the tire, such that the lug grooves on one side and the lug grooves on the other side form a directional tread pattern; and three circumferential grooves extending circumferentially around the tire, wherein the three circumferential grooves are disposed in a central region, the central region being a region enclosed by two straight parallel lines each passing through a center between contact width center, being defined as a center of a ground contacting area in the axial direction of the tire and a respective contact edge, being defined as an edge of the ground-contacting area in the axial direction of the tire, with shoulder regions being regions outside of the straight lines, and wherein an average contact length (a) of central blocks, which are blocks defined by a central circumferential groove that is a centrally located circumferential groove and intermediate circumferential grooves that are laterally located circumferential grooves of the three circumferential grooves and the lug grooves, and an average contact length (b) of intermediate blocks, which are blocks located in axially outer positions and defined by the laterally located circumferential grooves of the three circumferential grooves and the lug grooves, satisfy a relationship of "0.9·a<b<1.1·a", wherein shoulder grooves are grooves disposed discontinuously in a circumferential direction within a contact patch of the tire, wherein an average groove width of the lug grooves defining shoulder blocks is greater than an average groove width of the lug grooves defining central blocks, wherein a groove width of each of the intermediate circumferential grooves is wider than a groove width of the central circumferential groove, wherein the sum of the cross-sectional areas of the central circumferential groove, the intermediate circumferential grooves, and the shoulder grooves is smaller than the cross-sectional area of the lug grooves, and wherein the groove bottom of each of the lug grooves on the axial center side in the central blocks has a raised groove bottom portion having a cross-sectional area of 10% or more and 90% or less of the cross-sectional area of the respective lug groove, a groove depth of the central circumferential groove is deeper than a minimum depth of each of the raised groove bottom portions and less than a maximum depth of each of the lug grooves, the central circumferential groove being a circumferential groove located in the axial center of the tire of the circumferential grooves disposed in the central region, the intermediate circumferential grooves being circumferential grooves located in axially outer positions, and the shoulder grooves being circumferential grooves disposed in the shoulder regions, and the central blocks being blocks defined by the central circumferential groove, the intermediate circumferential grooves, and the lug grooves, the shoulder blocks being blocks defined by the shoulder grooves and the lug grooves, and the intermediate blocks being blocks defined by the intermediate circumferential grooves, the shoulder grooves, and the lug grooves.

3. The pneumatic tire according to claim 1,
wherein each of the shoulder grooves is disposed axially outward of the three circumferential grooves;
wherein the shoulder grooves are grooves extending with an inclination to the circumferential direction within a contact patch of the tire.

4. The pneumatic tire according to claim 2, wherein a groove depth of each of the intermediate circumferential grooves is formed deeper than a groove depth of each of the shoulder grooves.

5. The pneumatic tire according to claim 2, wherein the central blocks, the shoulder blocks, and the intermediate blocks have each a plurality of sipes formed on a ground contact surface side thereof, wherein a central sipe angle, which is an angle between the extension direction of the sipes formed in the central blocks and the circumferential direction of the tire, is smaller than a shoulder sipe angle, which is an angle between the extension direction of the sipes formed in the shoulder blocks and the circumferential direction of the tire, and wherein an intermediate sipe angle, which is an angle between the extension direction of the sipes formed in the intermediate blocks and the circumferential direction of the tire, is smaller than the central sipe angle,
wherein the sipes of each of the center blocks are configured such that the sipes are inclining in a same direction relative to the circumferential direction,
wherein the sipes of each of the intermediate blocks are configured such that the sipes are inclining in a same direction relative to the circumferential direction, and
wherein the sipes of each of the shoulder blocks are configured such that the sipes are inclining in a same direction relative to the circumferential direction.

6. The pneumatic tire according to claim 5, wherein 50% or more of the sipes formed in each block have a raised bottom portion whose depth is shallower than the middle part of the sipes on at least one of the axial end sides thereof, wherein of the sipes having the raised bottom portion, the sipes having the raised bottom portion on both axial end sides thereof have a depth on one end side thereof being 50% or less of the depth of the middle part of the sipes and a depth on the other end side thereof being 50% or more of the depth of the middle part of the sipes, and wherein at least some of the blocks have one or both of the depths on one end side and the depths on the other end side of circumferentially adjacent sipes being different from each other.

7. The pneumatic tire according to claim 2, wherein a groove wall angle with respect to the radical direction of the tire of a front end of each lug groove defining the central blocks is smaller than an average value of the groove wall angles of the lug grooves defining the intermediate blocks and the groove wall angles of the lug grooves defining the shoulder blocks.

8. The pneumatic tire according to claim 5, wherein the sipes formed in the shoulder blocks are 3D sipes.

9. The pneumatic tire according to claim 5, wherein the groove depth of the central circumferential groove is deeper than a minimum depth of a most shallow sipes and shallower than a maximum groove depth of a deepest lug groove.

10. The pneumatic tire according to claim 1, wherein a circumferential length of each of the central blocks is smaller than a width length of each of the central blocks.

11. The pneumatic tire according to claim 1, wherein a width length of each of the raised groove bottom portions is smaller than a width length of the respective lug groove in the center region.

12. The pneumatic tire according to claim 1, wherein each central block includes sipes communicating with a respective lug groove in the width direction and at least one end portion of each of the sipes is positioned on an outer side in the width direction than the raised groove bottom portion of the respective lug groove.

13. The pneumatic tire according to claim 12, wherein the end portion of each sipe communicating to a center lug groove is positioned on an outer side in the width direction than an outer end portion of an upper surface of the raised groove bottom portion of the center lug groove.

14. The pneumatic tire according to claim 2, wherein a circumferential length of each central block is smaller than a width length of the central block.

15. The pneumatic tire according to claim 2, wherein a width length of each raised groove bottom portion is smaller than a width length of the respective lug groove on the center region comprising the raised bottom portion.

16. The pneumatic tire according to claim 2, wherein each central block includes sipes communicating with a respective lug groove in the width direction and at least one end portion of each of the sipes is positioned on an outer side in the width direction than the raised groove bottom portion.

* * * * *